(12) United States Patent
Yazawa et al.

(10) Patent No.: US 7,088,549 B1
(45) Date of Patent: Aug. 8, 2006

(54) THIN-FILM MAGNETIC HEAD HAVING A HIGH RECORDING DENSITY AND FREQUENCY

(75) Inventors: Hisayuki Yazawa, Niigata-ken (JP); Naruaki Oki, Niigata-ken (JP); Kiyoshi Kobayashi, Niigata-ken (JP); Akira Koyama, Niigata-ken (JP); Yoshihiro Kanada, Niigata-ken (JP); Masaki Ikegami, deceased, late of Niigata-ken (JP); by Hiromi Ikegami, legal representative, Niigata-ken (JP); by Chiaki Ikegami, legal representative, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 1597 days.

(21) Appl. No.: 09/632,875

(22) Filed: Aug. 4, 2000
(Under 37 CFR 1.47)

(30) Foreign Application Priority Data

Aug. 6, 1999 (JP) ................................. 11-223831
May 19, 2000 (JP) ............................. 2000-147439

(51) Int. Cl.
*G11B 5/147* (2006.01)
(52) U.S. Cl. .................................................... 360/126
(58) Field of Classification Search ................ 360/126
See application file for complete search history.

(56) References Cited

U.S. PATENT DOCUMENTS

| | | | |
|---|---|---|---|
| 5,452,164 A | 9/1995 | Cole et al. | |
| 5,649,351 A | 7/1997 | Cole et al. | |
| 5,652,687 A | 7/1997 | Chen et al. | |
| 5,802,700 A | 9/1998 | Chen et al. | |
| 6,301,076 B1 * | 10/2001 | Stageberg et al. | .......... 360/126 |

FOREIGN PATENT DOCUMENTS

| | | |
|---|---|---|
| JP | 63-168811 | 7/1988 |
| JP | 6-28626 | 2/1994 |
| JP | 8-339508 | 12/1996 |
| JP | 10-233008 | 9/1998 |

* cited by examiner

*Primary Examiner*—A. J. Heinz
(74) *Attorney, Agent, or Firm*—Brinks Hofer Gilson & Lione

(57) ABSTRACT

A gap depth determining insulating layer is formed on a lower core layer. A curved face is formed on a front edge face of the gap depth determining insulating layer so as to gradually depart from an ABS surface from the bottom at the lower core layer to the top of the curved face. A back end of an upper magnetic layer can be formed on the gap depth determining insulating layer, whereby the volume of the upper magnetic layer can be increased while a gap depth is maintained at a predetermined length.

25 Claims, 17 Drawing Sheets

US 7,088,549 B1

THIN-FILM MAGNETIC HEAD HAVING A HIGH RECORDING DENSITY AND FREQUENCY

BACKGROUND OF THE INVENTION

1. Field of the Invention

The present invention relates to recording thin-film magnetic heads used, for example, in floating type magnetic heads. More particularly, the present invention relates to a thin-film magnetic head generating leakage flux at a satisfactory location in the vicinity of a gap layer so as to fulfill the requirements for high recording density and high recording frequency, and relates to a manufacturing method therefor.

2. Description of the Related Art

FIG. 31 is a partial front view showing the structure of a conventional thin-film magnetic head (inductive head), FIG. 32 is a partial cross-sectional view of the thin-film magnetic head taken along the line 32—32 in FIG. 31 and observed from the direction indicated by the arrow shown therein.

Reference numeral 1 in FIGS. 31 and 32 indicates a lower core layer composed of a magnetic material such as a permalloy, and an insulating layer 9 is formed on the lower core layer 1.

A groove 9a extending from an opposing face (hereinafter referred to as the ABS surface) opposing a recording medium in a height direction (the Y direction in the figure) is formed in the insulating layer 9, and the inside width of the groove 9a is equivalent to a track width Tw.

In the groove 9a, a lower magnetic layer 3 magnetically coupled with the lower core layer 1, a gap layer 4, and an upper magnetic layer 5 magnetically coupled with an upper core layer 6 are sequentially formed from the bottom by plating.

As shown in FIG. 31, the upper core layer 6 is formed on the upper magnetic layer 5 by plating.

As shown in FIG. 32, a coil layer 7 patterned in the spiral form is formed on the insulating layer 9 at a place extending from the groove 9a formed in the insulating layer 9 in the height direction (the Y direction in the figure).

The coil layer 7 is covered with a coil insulating layer 8 composed of a resist or the like, and the upper core layer 6 is formed on the coil insulating layer 8. The upper core layer 6 is magnetically coupled with the upper magnetic layer 5 at a front portion thereof and is magnetically coupled with the lower core layer 1 at a base portion 6b of the upper core layer 6.

In the inductive head shown in FIGS. 31 and 32, when a write current is applied to the coil layer 7, a recording magnetic field is induced in the lower core layer 1 and the upper core layer 6, so that a magnetic signal is written on a recording medium such as a hard disk by a magnetic field leakage generated from a gap between the lower magnetic layer 3 magnetically coupled with the lower core layer 1 and the upper magnetic layer 5 magnetically coupled with the upper core layer 6.

In the inductive head shown in FIGS. 31 and 32, in the vicinity of the ABS surface (the face opposing a recording medium), the lower magnetic layer 3, the gap layer 4, and the upper magnetic layer 5, having widths equivalent to the track width in some parts thereof are formed, whereby the inductive head mentioned above can be applied to a narrower track width configuration.

A method for manufacturing the inductive head shown in FIGS. 31 and 32 will be described. The insulating layer 9 is formed on the lower core layer 1, and the groove 9a having the width equivalent to the track width Tw and a predetermined length extending from the ABS surface in the height direction is formed in the insulating layer 9.

Next, in the groove 9a, the lower magnetic layer 3, the gap layer 4 and the upper magnetic layer 5 are sequentially formed by plating, and the coil layer 7 having a pattern is subsequently formed on the insulating layer 9 in a posterior region (in the height direction) of the groove 9a formed in the insulating layer 9.

In addition, the coil insulating layer 8 is formed so as to cover the coil layer 7, and the upper core layer 5 is continuously formed on the upper magnetic layer 5 and the coil insulating layer 8 by flame plating, whereby the inductive head shown in FIGS. 31 and 32 is completed.

In the thin-film magnetic head shown in FIGS. 31 and 32, as described above, when a write current is applied to the coil layer 7, a recording magnetic field is induced in the lower core layer 1 and the upper core layer 6, and magnetic flux flows into the lower magnetic layer 3 and the upper magnetic layer 5.

However, as shown in FIG. 32, lengths T1 of the lower magnetic layer 3, the gap layer 4, and the upper magnetic layer 5 extending from the ABS surface to the back ends thereof in the height direction are equal to each other.

The length T1 is called a gap depth (Gd), and in conventional thin-film magnetic heads, the length of T1 must be very short in order to increase the leakage flux from the gap layer 4.

However, in the thin-film magnetic head shown in FIG. 32, as described above, since the lengths T1 of the lower magnetic layer 3, the gap layer 4, and the upper magnetic layer 5 extending from the ABS surface to the back ends thereof in the height direction are formed to be equal to each other, when the T1 is formed to be shorter, an area of an interface between the upper core layer 6 and the upper magnetic layer 5 is accordingly smaller. Consequently, the magnetic flux flowing into the upper core layer 6 is restricted at the interface mentioned above, and the magnetic flux is in a state of magnetic saturation before reaching the gap layer 4. That is, leakage flux is generated at a location other than the vicinity of the gap layer 4, and particularly when recording frequency is increased, there is a problem in that accurate recording cannot be performed.

In the thin-film magnetic head shown in FIGS. 31 and 32, in order to suppress the generation of write fringing, a distance H1 in the vicinity of the ABS surface from the upper surface of the lower core layer 1 to the bottom surface of the upper core layer 6 must be larger.

However, when the distance H1 is larger, the magnetic flux is more likely to be in a state of magnetic saturation before reaching the gap layer 4. As has thus been described, the structure of the conventional thin-film magnetic head cannot have superior magnetic flux flow while suppressing the generation of write fringing.

SUMMARY OF THE INVENTION

In order to solve the problems described above, an object of the present invention is to provide a thin-film magnetic head capable of performing accurate magnetic recording by reliably generating leakage flux from the gap layer, particularly when narrower track width configuration is desired, and to provide a manufacturing method therefor.

A thin-film magnetic head of the present invention comprises a lower core layer, a gap layer formed on the lower core layer with or without a lower magnetic layer disposed under the gap layer, an upper magnetic layer for determining a track width formed on the gap layer, in which the width of the upper magnetic layer is smaller than that of the lower core layer, an upper core layer formed on the upper magnetic layer, and a gap depth (Gd) determining insulating layer for determining a gap depth which is a distance in a height direction of an interface between the gap layer and the upper magnetic layer, in which the Gd determining insulating layer is disposed in a posterior region extending from an opposing face opposing a recording medium in the height direction, wherein a contacting face between the upper magnetic layer and the Gd determining insulating layer is provided at a location deeper in the height direction than the location at which the gap depth is formed.

In the present invention, the Gd determining insulating layer, which determines the gap depth, is provided in the posterior region extending from the opposing face (the ABS surface) in the height direction. The end of the interface in the height direction between the gap layer and the upper magnetic layer is provided so as to be in contact with a front edge face of the Gd determining insulating layer, whereby the gap depth is determined.

In the thin-film magnetic head of the present invention, the contacting face between the upper magnetic layer and the Gd determining insulating layer is preferably formed so as to be gradually deeper in the height direction from the bottom to the top of the contacting face than the location at which the gap depth is formed. That is, the back end of the upper magnetic layer in the height direction can be extended onto the Gd determining insulating layer. Accordingly, the area of the interface between the upper core layer and the upper magnetic layer can be increased, and the volume of the upper magnetic layer can also be increased. As a result, restriction of the magnetic flux flowing through the upper core layer at the interface can be suppressed, and since the magnetic flux easily flows in the upper magnetic layer, saturation of the magnetic flux before reaching the gap layer can be prevented.

That is, in the present invention, leakage flux can be reliably generated from the gap layer, and even when recording frequency is increased, accurate recording can be performed.

In the present invention, the back end of the upper magnetic layer is extended deeper in the height direction than that of the conventional upper magnetic layer. However, the back end of the gap layer is determined by the front edge face of the Gd determining insulating layer, so that the area of the gap layer can be maintained to be small. Consequently, leakage flux from the gap layer cannot be reduced.

In the thin-film magnetic head of the present invention, a curved face or an inclining face (hereinafter, a "curved face" and an "inclining face" collectively called a "sloping face") of the Gd determining insulating layer may be formed so as to be gradually deeper in the height direction from the bottom to the top of the sloping face than the location at which the gap depth is formed, and the upper magnetic layer may be continuously formed on the gap layer and the sloping face of the Gd determining insulating layer.

An angle formed by the upper surface of the lower core layer and a virtual plane including the top edge and the bottom edge of the contacting face between the gap layer and the gap depth determining insulating layer is preferably in the range of about 45 to 90°.

When the angle formed by the upper surface of the lower core layer and the virtual plane including the top edge and the bottom edge of the contacting face between the gap layer and the gap depth determining insulating layer is less than about 45°, variation in the gap depth is larger when the thickness of the gap layer varies, and sagging in the gap layer is likely to occur in the vicinity of the contacting face between the gap layer and the Gd determining insulating layer.

In addition, when the angle formed by the upper surface of the lower core layer and the virtual plane including the top edge and the bottom edge of the contacting face between the gap layer and the gap depth determining insulating layer is more than about 90°, recesses may be generated in the upper magnetic layer, and hence, flow of magnetic flux in the upper magnetic layer is restricted, and recording characteristics of the magnetic head may be degraded.

It is more preferable that the angle formed by the upper surface of the lower core layer and the virtual plane including the top edge and the bottom edge of the contacting face between the gap layer and the gap depth determining insulating layer be not more than about 80°, since the problem described below can be prevented. The problem mentioned above is caused by a resist penetrating into the lower magnetic layer and the gap layer, and as a result, the track width of the magnetic head not being controllable, as described later in a manufacturing method for the thin-film magnetic head of the present invention.

An angle formed by the upper surface of the lower core layer and a virtual plane including the top edge and the bottom edge of a contacting face between the lower magnetic layer and the gap depth determining insulating layer is preferably in the range of about 45 to 90°.

When the angle formed by the upper surface of the lower core layer and the virtual plane including the top edge and the bottom edge of the contacting face between the lower magnetic layer and the gap depth determining insulating layer is less than about 45°, the distance from a front edge of the Gd determining insulating layer to the contacting face between the gap layer and the Gd determining insulating layer is larger, and hence, an error on the distance mentioned above is also larger. As a result, variation in the gap depth is greater among products.

In addition, when the angle formed by the upper surface of the lower core layer and the virtual plane including the top edge and the bottom edge of the contacting face between the lower magnetic layer and the gap depth determining insulating layer is more than about 90°, recesses may be generated in the upper magnetic layer, and hence, flow of magnetic flux in the upper magnetic layer is restricted, and recording characteristics of the magnetic head may be degraded.

It is more preferable that the angle formed by the upper surface of the lower core layer and the virtual plane including the top edge and the bottom edge of the contacting face between the lower magnetic layer and the gap depth determining insulating layer is not more than about 80°, since the problem described below can be prevented. The problem mentioned above is caused by a resist penetrating into the lower magnetic layer and the gap layer, and as a result, the track width of the magnetic head not being controllable, as described later in a manufacturing method for the thin-film magnetic head of the present invention.

In the thin-film magnetic head of the present invention, when the front edge face of the Gd determining insulating layer at the opposing face side has a vertical face being approximately vertical from the lower core layer, and the back ends in the height direction of the gap layer and the interface between the gap layer and the upper magnetic layer are formed at the vertical face mentioned above, the gap depth can be accurately determined.

In addition, the Gd determining insulating layer may be formed of an organic material. In particular, when the Gd determining insulating layer is formed of an ultraviolet photocurable resin, it is preferable since the front edge face of the Gd determining insulating layer can be easily formed in a predetermined shape.

Furthermore, when the Gd determining insulating layer is formed of an inorganic material, the Gd determining insulating layer is precisely formed, and hence, variations in dimensions of the gap depth and thickness of the gap depth layer may be suppressed.

As a material for forming the Gd determining insulating layer, $SiO_2$, $Al_2O_3$, or the like may be used.

In addition, the gap layer is preferably formed of a nonmagnetic metal material by plating.

When the gap layer is formed of a nonmagnetic metal material by plating, as described later in a manufacturing method, the lower magnetic layer, the gap layer, and the upper magnetic layer can be sequentially formed by plating.

As the nonmagnetic metal material for forming the gap layer, at least one selected from the group consisting of NiP, NiPd, NiW, NiMo, NiRh, Au, Pt, Rh, Pd, Ru, and Cr may be used.

When the nonmagnetic metal material is NiP, it is preferable that the P content in the NiP measured by inductively coupled plasma emission spectrometry be in the range of about 11 to 14 mass percent. It is more preferable that the P content in the NiP measured by inductively coupled plasma emission spectrometry be in the range of about 12.5 to 14 mass percent, since the NiP remains in a nonmagnetic state therein even when subjected to heating at about 200° C. or more.

Accordingly, in the present invention, leakage flux can be reliably generated in the vicinity of the gap layer.

In addition, an insulating layer may be formed in the posterior region of the Gd determining insulating layer in the height direction so as to be in contact therewith, and when the interface between the upper magnetic layer and the upper core layer is set to be a reference plane, the upper surface of the insulating layer may also be formed so as to be at the same level as the reference plane. Accordingly, when a coil layer inducing a recording magnetic field in the upper core layer and the lower core layer is formed on the insulating layer, the coil layer can be formed on the reliably planarized surface of the insulating layer, so that a coil layer having superior pattern accuracy can be formed.

The insulating layer described above is preferably formed so as to cover the Gd determining insulating layer and to be in contact with the upper magnetic layer at the back end thereof in the height direction.

The insulating layer is preferably an inorganic insulating layer comprising an inorganic material.

A back gap layer composed of a magnetic metal material and/or a nonmagnetic metal material may be formed in the insulating layer in a posterior region of the Gd determining insulating layer in the height direction so as to be in contact with the lower core layer. It is preferable that the upper surface of the back gap layer be at the same level as the reference plane and the upper surface of the insulating layer, and a base portion of the upper core layer be magnetically coupled with the back gap layer, since the lower core layer and the upper core layer can be easily magnetically coupled with each other as described later in a manufacturing method.

In addition, it is preferable that back gap layers composed of a magnetic metal material and/or a nonmagnetic metal material be formed on lead electrode layers formed under the insulating layer, in which the upper surfaces of the back gap layers are at the same level as the reference plane and the upper surface of the insulating layer, and that terminals of the coil layer be electrically connected with the back gap layers, since the coil layer and the lead electrode layers can be easily connected with each other as described later in a manufacturing method.

When the back gap layer is formed of a multiple-layer film having the same laminated structure as that formed of the lower magnetic layer, the gap layer, and the upper magnetic layer, the back gap layers can be simultaneously formed with the lower magnetic layer, the gap layer, and the upper magnetic layer as described later in a manufacturing method, so that the manufacturing process can be simplified.

However, when the back gap layer is a single layer film composed of the same material as that for the lower core layer or the upper magnetic layer, the magnetic and electric characteristics thereof are superior to those of the back gap layer comprising the same material as that for the gap layer.

In addition, in order to improve magnetic and electric characteristics, the back gap layer may be a single layer film or a multiple-layer film, composed of a magnetic metal material differing from a material for the lower core layer or a material for the upper core layer.

A method for manufacturing a thin-film magnetic head of the present invention comprises a step (a) of forming the Gd determining insulating layer on the lower core layer at a predetermined distance extending from the opposing face opposing a recording medium in the height direction so as to have a curved or an inclined front edge face (hereinafter, a "curved face" and an "inclining face" collectively called a "sloping face") at the opposing face side, in which the front edge face gradually departs from the opposing face in the height direction from the bottom to the top of the sloping front edge face, a step (b) of forming the gap layer on the lower core layer continuously from the opposing face to the front edge face of the Gd determining insulating layer with or without the lower magnetic layer formed under the gap layer, a step (c) of forming the upper magnetic layer for determining the track width continuously on the gap layer to the sloping front edge face of Gd determining insulating layer, in which the width of the upper magnetic layer is restricted to be smaller than that of the lower core layer, and a step (d) of forming the upper core layer on the upper magnetic layer.

As described above, in the present invention, the Gd determining insulating layer determining the gap depth is first formed at a predetermined distance extending from the opposing face (the ABS surface) in the height direction, the back end of the gap layer in the height direction is subsequently formed so as to be in contact with the sloping front edge face of the Gd determining insulating layer.

In addition, the upper magnetic layer is formed not only on the gap layer but is also formed on the sloping front edge face of the Gd determining insulating layer by extending the back side of the upper magnetic layer thereto.

That is, the area of the interface between the upper core layer and the upper magnetic layer can be increased, and the volume of the upper magnetic layer can also be increased. Accordingly, since restriction of the magnetic flux flowing through the upper core layer at the interface can be suppressed, and the magnetic flux easily flows in the upper magnetic layer, a thin-film magnetic head capable of preventing saturation of the magnetic flux before reaching the gap layer can be manufactured.

That is, in the present invention, a thin-film magnetic head can be manufactured in which leakage flux can be reliably generated from the gap layer, and even when recording frequency is increased, accurate recording can be performed.

In the present invention, the back end of the upper magnetic layer extends deeper in the height direction than that of the conventional upper magnetic layer. However, the back end of the gap layer is determined by the front edge face of the Gd determining insulating layer, so that the area of the gap layer can be maintained to be small. Consequently, leakage flux from the gap layer cannot be reduced.

In the step (a), in order to form the sloping front edge face of the Gd determining insulating layer in which the front edge face gradually departs from the opposing face in the height direction from the bottom at the core layer to the top of the front edge face, it is preferable to use a method comprising the steps of preparing an ultraviolet photocurable resin as a resist for forming the Gd determining insulating layer, forming a resist layer on the lower core layer, heating the resist layer so as to form the sloping front edge face of the gap depth determining insulating layer, and exposing the resist layer to ultraviolet light so as to cure the gap depth determining insulating layer.

Alternatively, it is more preferable to use a method comprising the steps of forming an inorganic material layer or an organic material layer to be formed as the gap depth determining insulating layer on the lower core layer, forming a resist layer on the inorganic material layer or the organic material layer, heating the resist layer so as to form a sloping face thereon equivalent to the sloping face formed on the gap depth determining insulating layer, and etching the inorganic material layer or the organic material layer using the resist layer as a mask so as to form the gap depth determining insulating layer. As a material for the organic material layer, epoxy resins, novolac resins, and the like may be used, and as a material for the inorganic material layer, $SiO_2$, $Al_2O_3$, and the like may be used.

It is preferable that the sloping face of the gap depth determining insulating layer be formed in the step (a) so that the angle formed by the upper surface of the lower core layer and the virtual plane including the top edge and the bottom edge of the contacting face between the gap layer formed in the step (b) and the gap depth determining insulating layer is in the range of about 45 to 90°.

In particular, it is more preferable that the sloping face of the gap depth determining insulating layer be formed in the step (a) so that the angle formed by the upper surface of the lower core layer and the virtual plane including the top edge and the bottom edge of the contacting face between the gap layer formed in the step (b) and the gap depth determining insulating layer is not more than about 80°.

In addition, it is preferable that the sloping face of the gap depth determining insulating layer be formed in the step (a) so that the angle formed by the upper surface of the lower core layer and the virtual plane including the top edge and the bottom edge of the contacting face between the lower magnetic layer formed in the step (b) and the gap depth determining insulating layer is in the range of about 45 to 90°.

In particular, it is more preferable that the sloping face of the gap depth determining insulating layer be formed in the step (a) so that the angle formed by the upper surface of the lower core layer and the virtual plane including the top edge and the bottom edge of the contacting face between the lower magnetic layer formed in the step (b) and the gap depth determining insulating layer is not more than 80°.

In addition, it is preferable to perform steps (e), (f), and (g) described below after the step (c), since the coil layer having superior pattern accuracy for inducing a recording magnetic field in the upper core layer and the lower core layer can be formed on the planarized surface of the insulating layer.

The steps mentioned above are: the step (e) of forming the insulating layer on the lower core layer in a posterior region of the gap depth determining insulating layer in the height direction, and planarizing the upper surface of the insulating layer so as to be at the same level as that of the upper magnetic layer, the step (f) of forming the coil layer on the planarized insulating layer, and the step (g) of forming the upper core layer on the upper magnetic layer.

In the step (e) of the present invention, the insulating layer is formed on the lower core layer in the posterior region of the gap depth determining insulating layer in the height direction, and the upper surface of the insulating layer is planarized so as to be at the same level as that of the upper magnetic layer, whereby the coil layer can be formed on the planarized insulating layer.

In addition, it is preferable to form the back gap layer, at least prior to the step (e), composed of a magnetic metal material and/or a nonmagnetic material on the lower core layer in a posterior region of the Gd determining insulating layer in the height direction, to expose the upper surface of the back gap layer in the step (e), and to magnetically couple the base portion of the upper core layer with the back gap layer in the step (g).

In the case in which the back gap layer is formed on the lower core layer, and the upper surface of the back gap layer is exposed in the step (e) in which the upper surface of the insulating layer is polished so as to be at the same level as that of the upper magnetic layer, a step can be omitted, which step is to form an opening to expose the lower core layer in the insulating layer covering the lower core layer in order to magnetically couple the lower core layer with the upper core layer.

In addition, it is preferable to form the back gap layers, at least prior to the step (e), composed of a magnetic metal material and/or a nonmagnetic material to be electrically connected with the lead electrode layers, to expose the upper surfaces of the back gap layers in the step (e), and to electrically connect the terminals of the coil layer with the back gap layers in the step (f).

In the case in which the back gap layers are formed on the lower core layer, and the upper surfaces of the back gap layers are exposed in the step (e) in which the upper surface of the insulating layer is polished so as to be at the same level as that of the upper magnetic layer, a step can be omitted, which step is to form openings to expose the lead electrode layers in the insulating layer covering the lower core layer in order to electrically interconnect the coil layer and the lead electrode layers.

When the gap layer is formed on the lower core layer with or without the lower magnetic layer disposed under the gap layer in the step (b), and the upper magnetic layer is formed on the gap layer and the gap depth determining insulating layer in the step (c), the back gap layer to be connected with the upper core layer and/or the coil layer may be simultaneously formed, whereby an additional step for forming the back gap layer can be omitted.

However, when the back gap layer is formed of a single layer film composed of the same material as that for the lower core layer or the upper core layer, the magnetic and the electric characteristics thereof are superior to those comprising the same material as that for the gap layer.

In addition, in order to further improve magnetic and electric characteristics, the back gap layer may be formed of a single layer film or a multiple-layer film composed of a magnetic metal material differing from that for the lower core layer or the upper core layer.

Furthermore, it is preferable that the gap layer formed in the step (b) be sequentially formed by plating with the upper magnetic layer formed in the step (c) and/or the lower magnetic layer formed in the step (b).

In order to sequentially form the gap layer with the upper magnetic layer and/or the lower magnetic layer by plating, the gap layer must be formed of a nonmagnetic metal material by plating.

As a nonmagnetic metal material which can be applied by plating, at least one selected from the group consisting of NiP, NiPd, NiW, NiMo, NiRh, Au, Pt, Rh, Pd, Ru, and Cr may be used.

When the nonmagnetic metal material forming the gap layer by plating is NiP, the P content in the NiP measured by inductively coupled plasma emission spectrometry is preferably in the range of about 11 to 14 mass percent. In particular, it is more preferable that the P content in the NiP measured by inductively coupled plasma emission spectrometry be in the range of about 12.5 to 14 mass percent.

DESCRIPTION OF THE PREFERRED EMBODIMENT

Figure 1:
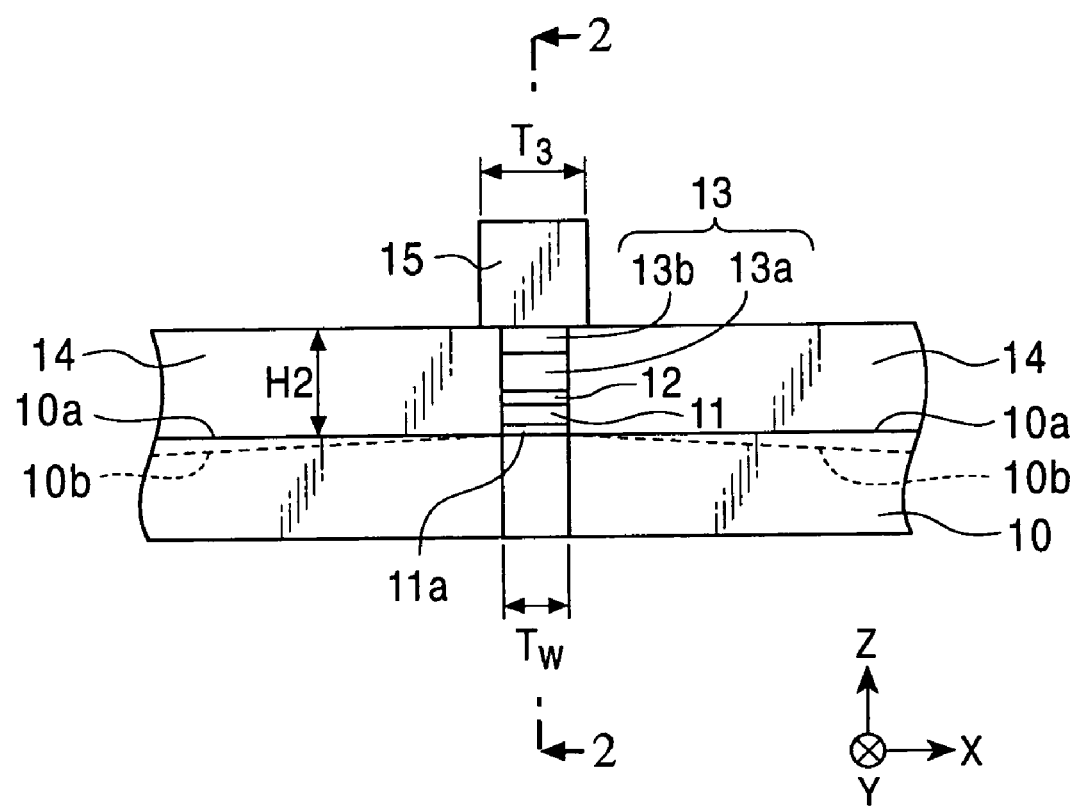
FIG. 1 is a partial front view showing the structure of a thin-film magnetic head according to a first embodiment of the present invention.
Figure 2:
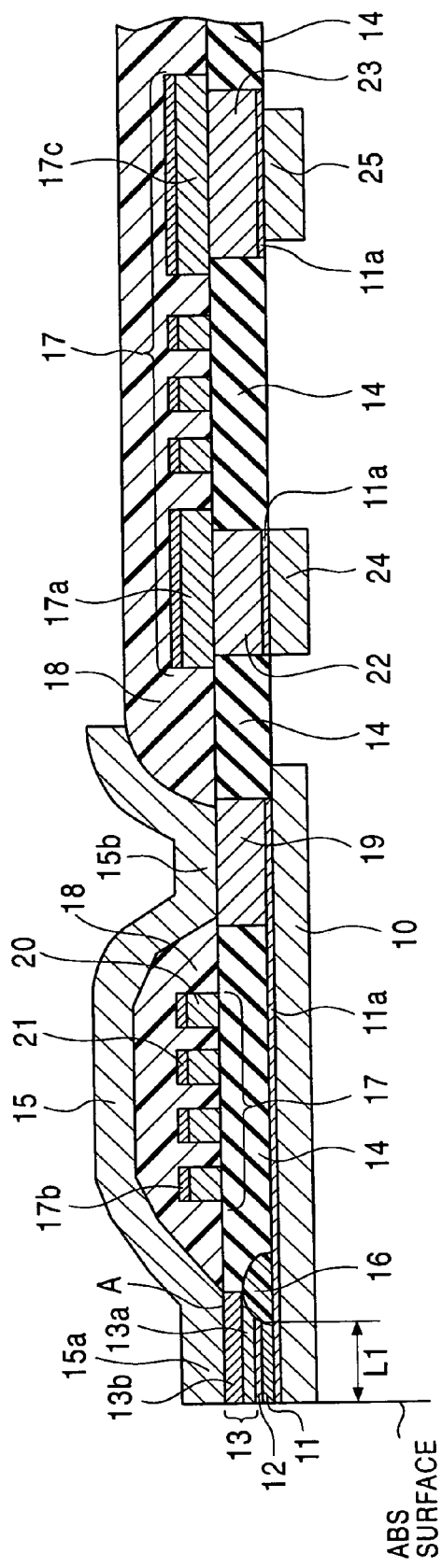
FIG. 2 is a partial cross-sectional view of the thin-film magnetic head taken along the line 2—2 in the FIG. 2.

FIG. 1 is a partial front view showing the structure of a thin-film magnetic head according to a first embodiment of the present invention. FIG. 2 is a partial cross-sectional view of the thin-film magnetic head taken along the line 2—2 in FIG. 1 and observed from the direction indicated by the arrows shown therein.

The thin-film magnetic head shown in FIG. 1 is an inductive head for recording, and a read head (an MR head) exploiting magnetoresistance may be provided under the inductive head of the present invention.

Reference numeral 10 shown in FIGS. 1 and 2 indicates a lower core layer composed of a magnetic material, such as a permalloy. In this connection, when a read head is provided under the lower core layer 10, a shield layer protecting a magnetoresistive element from noise may be provided in addition to the lower core layer 10, or instead of providing the shield layer mentioned above, the lower core layer 10 may be used as an upper shield layer in the read head.

As shown in FIG. 1, the upper surfaces of the lower core layer 10 extending from the base edges of a lower magnetic layer 11 described later are planar surfaces 10a and 10a indicated by the solid lines in the figure. However, as shown in FIG. 1, the upper surfaces of the lower core layer may be inclining surfaces 10b and 10b indicated by the dotted lines inclining to directions so as to depart from the upper core layer 15. When the inclining surfaces 10b and 10b are formed as the upper surfaces of the lower core layer 10, write fringing can be further effectively prevented.

As shown in FIG. 1, a plating underlayer 11a composed of a magnetic metal material is formed on the lower core layer 10, and the lower magnetic layer 11, a gap layer 12, and an upper magnetic layer 13 are sequentially formed.

As shown in FIGS. 1 and 2, the lower magnetic layer 11 is formed by plating on the lower core layer 10 with the plating underlayer 11a provided therebetween. The lower magnetic layer 11 is magnetically coupled with the lower core layer 10, and the lower magnetic layer 11 may be formed of a material used for the lower core layer 10 or may be formed of a material differing therefrom. In addition, the lower magnetic layer 11 may be composed of a single layer film or a multiple-layer film.

In addition, as shown in FIGS. 1 and 2, the nonmagnetic gap layer 12 is formed on the lower magnetic layer 11.

In the present invention, the gap layer 12 is preferably composed of a nonmagnetic metal material, and is preferably formed on the lower magnetic layer 11 by plating. In the present invention, as the nonmagnetic metal material mentioned above, at least one selected from the group consisting of NiP, NiPd, NiW, NiMo, NiRh, Au, Pt, Rh, Pd, Ru, and Cr is preferably used, and the gap layer 12 may be composed of a single layer film or a multiple-layer film.

When the nonmagnetic metal material forming the gap layer 12 is NiP, the P content in the NiP measured by inductively coupled plasma emission spectrometry is preferably 11 to 14 mass percent in order that the gap layer 12 be a nonmagnetic layer. In this connection, it is more preferable that the P content in the NiP measured by inductively coupled plasma emission spectrometry be in the range of about 12.5 to 14 mass percent, since the NiP remains in a nonmagnetic state even when subjected to heating at 200° C. or more.

Next, the upper magnetic layer 12 described later magnetically coupled with the upper core layer 15 is formed on the gap layer 12 by plating. In this connection, the upper magnetic layer 13 may be formed of a material used for the upper core layer 15 or may be formed of a material differing therefrom.

When the gap layer 12 is composed a nonmagnetic material as described above, the lower magnetic layer 11, the gap layer 12, and the upper magnetic layer 13 can be sequentially formed by plating.

In the present invention, the gap layer 12 may be formed directly on the lower core layer 10 without the lower magnetic layer provided therebetween that is in contact with the lower core layer 10. However, in order to efficiently suppress write fringing, the lower magnetic layer 11 at least about 0.3 μm thick is preferably formed on the upper surface of the lower core layer 10.

As described above, the lower magnetic layer 11 and the upper magnetic layer 13 may be formed of materials used for the associated core layers magnetically coupled therewith or may be formed of materials differing therefrom. However, in order to increase recording density, the lower magnetic layer 11 and the upper magnetic layer 13 opposing the gap layer 12 each preferably have a higher saturated magnetic flux density than that of the associated core layer magnetically coupled with the magnetic layer. Since the lower magnetic layer 11 and the upper magnetic layer 13 have higher saturated magnetic flux densities, a recording magnetic field can be localized in the vicinity of the gap layer, so that the recording density can be improved.

The upper magnetic layer shown in FIGS. 1 and 2 is a two-layer film composed of a first upper magnetic layer 13a and a second magnetic layer 13b. The first upper magnetic layer 13a is composed of a magnetic material having a higher saturated magnetic flux density than that of the second magnetic layer 13b. As described above, when the upper magnetic layer 13 is composed of multiple films so that a film closer to the gap layer has a higher saturated magnetic flux density, the magnetic flux flowing from the upper core layer 15 is readily localized in the vicinity of the gap layer, and as a result, the recording density can be improved.

However, the upper magnetic layer 13 may be composed of a single layer film. In addition, the upper magnetic layer 13 may be composed of three films or more.

In the thin-film magnetic head shown in FIGS. 1 and 2, the width of the upper magnetic layer 13 is formed so as to be smaller than that of the lower core layer 10, and the track width Tw is determined by the width of the upper magnetic layer 13.

The track width Tw is preferably formed to be not more than about 0.7 μm, and more preferably, not more than about 0.4 μm. A method for adjusting the track width Tw will be described later in detail, but the dimension of the width adjusted by the method mentioned above is not more than the limiting value of resolution when a resist is exposed and developed.

As shown in FIG. 1, the total thickness of the lower magnetic layer 11, the gap layer 12, and the upper magnetic layer 13 is formed to be H2. The individual layers are, for example, the lower magnetic layer 11 is about 0.4 μm thick, the gap layer 12 is about 0.2 μm thick, and the upper magnetic layer 13 is about 2 μm thick.

As shown in FIG. 2, a Gd determining insulating layer 16 composed of an insulating material such as a resist is formed in posterior regions of the lower magnetic layer 11, the gap layer 12, and the upper magnetic layer 13.

Figure 3:
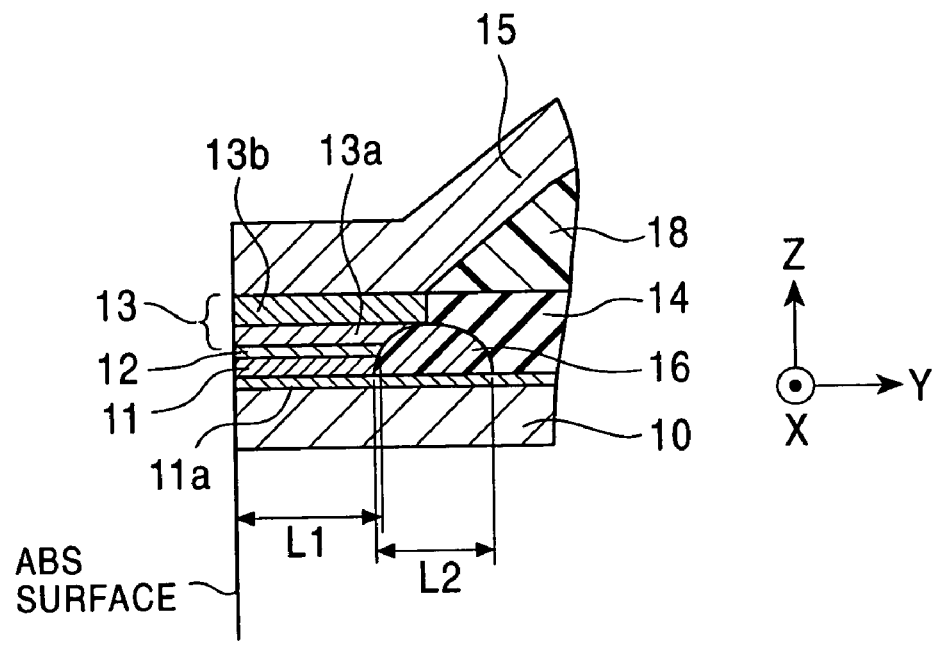
FIG. 3 is a partial cross-sectional view of the thin-film magnetic head in the vicinity of an ABS surface in the FIG. 2.

FIG. 3 is a partial enlarged cross-sectional view of the thin-film magnetic head shown in FIG. 2 in the vicinity of the ABS surface.

A front edge face of the Gd determining insulating layer 16 at an opposing face (ABS surface) opposing a recording medium side has a curved surface which gradually departs from the ABS surface in a height direction from the bottom to the top of the curved surface (the Z direction in the figure). A depth (gap depth) of an interface between the gap layer 12 and the upper magnetic layer 13 in a height direction is determined by the front edge face of the Gd determining insulating layer 16 so as to be L1.

As shown in FIG. 3, a contacting face between the upper magnetic layer 13 and the Gd determining insulating layer 16 is formed so as to be gradually deeper than the gap depth in the height direction from the bottom to the top of the contacting face (the Z direction in the figure).

That is, the distance of the front edge face of the Gd determining insulating layer 16 from the ABS surface is greater when it is closer to the upper core layer 15 (the Z direction in the figure).

Figure 31:
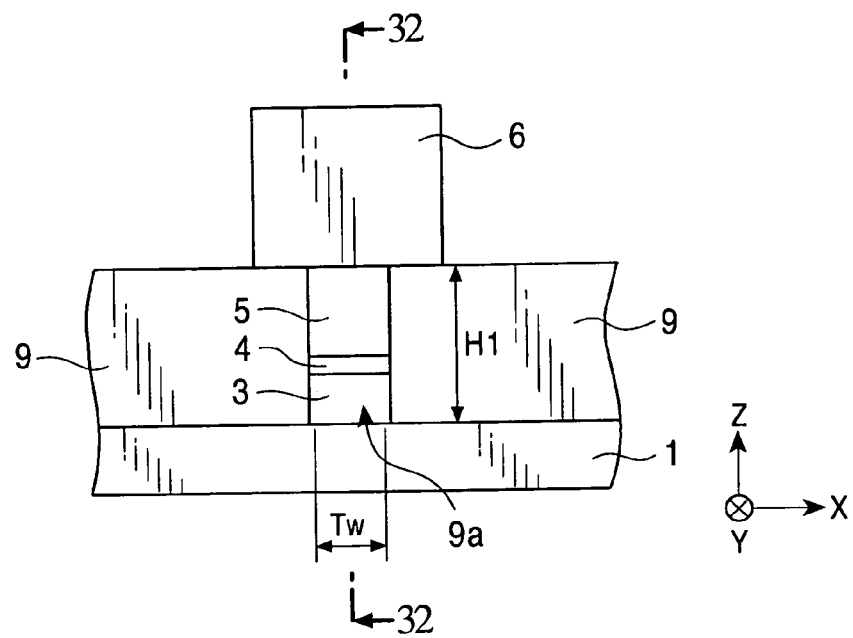
FIG. 31 is a partial front view showing the structure of a conventional thin-film magnetic head according to the prior art.
Figure 32:
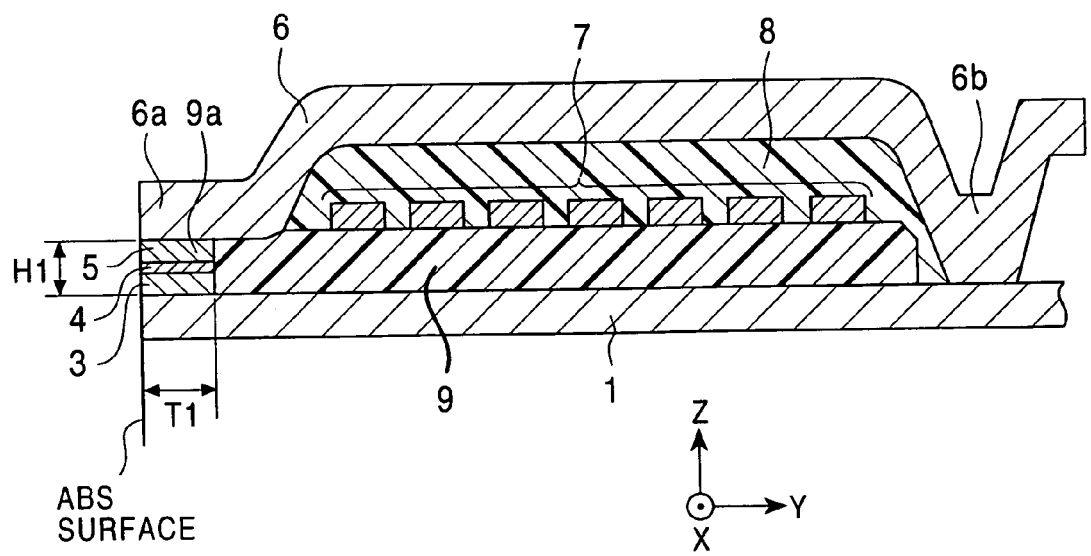
FIG. 32 is a partial cross-sectional view of the thin-film magnetic head taken along the line 32—32 in FIG. 31.

The upper magnetic layer 13 extends in the height direction (the Y direction in the figure) and the back end thereof is in contact with the curved front edge face of the Gd determining insulating layer 16. That is, the area of the interface between the upper magnetic layer 13 and the upper core layer 15 magnetically coupled therewith is larger than the product of the gap depth length and the track width Tw. The area described above is greater than that of the conventional thin-film magnetic head shown in FIGS. 31 and 32 in which the length T1 of the upper magnetic layer 5 in the height direction is formed approximately equal to that of the gap depth, and hence, the volume of the upper magnetic layer 13 can be increased. Consequently, restriction of the magnetic flux flowing through the upper core layer 15 at the interface can be suppressed, and the magnetic flux readily flows in the upper magnetic layer 13, whereby saturation of the magnetic flux before reaching the gap layer 12 can be prevented.

That is, according to the present invention, leakage flux can be reliably generated in the vicinity of the gap layer 12, and even when recording frequency is increased, accurate recording can be performed.

In addition, in order to increase leakage flux in the vicinity of the gap layer 12, the area of the gap layer 12 is preferably as small as possible. In the embodiment of the present invention, the length L1 of the upper surface (the interface with the upper magnetic layer) of the gap layer 12 from the front edge face of the Gd determining insulating layer 16 to the opposing face (the ABS surface) is set to be L1, and hence, the area of the gap layer 12 is not too great.

That is, in the present invention, as shown in FIG. 3, the length of the upper magnetic layer 13 can be formed so as to be longer than those of the gap layer 12 and the lower magnetic layer 11, and as a result, the volume of the upper magnetic layer 13 can be increased without increasing the area of the gap layer 12.

Next, as shown in FIG. 2, in a posterior region of the Gd determining insulating layer 16 in the height direction, an underlayer insulating layer 14 is formed on the lower core layer 10 so as to cover the Gd determining insulating layer 16 and to be in contact with the back end of the upper magnetic layer 13. When an interface between the upper magnetic layer 13 and the upper core layer 15 is set to be a reference plane A, the upper surface of the underlayer insulating layer 14 is flush with the reference surface A. The underlayer insulating layer 14 is an inorganic insulating layer composed of an inorganic material, and the inorganic material is preferably at least one selected from the group consisting of $Al_2O_3$, $SiO_2$, $Ta_2O_5$, and AlN.

As shown in FIG. 2, a coil layer 17 composed of copper or the like is formed in a spiral shape having a center 17a thereof so as to induce a recording magnetic field in the upper core layer 15 and the lower core layer 10 on the lower insulating layer 14.

A coil insulating layer 18 composed of an organic material, such as a resist, a polyimide resin, or the like is formed on the coil layer 17, and the upper core layer 15 composed of a magnetic material such as a permalloy is formed by flame plating or the like on the coil insulating layer 18.

The front portion 15a of the upper core layer 15 is formed so as to be in contact with the upper magnetic layer 13, and a base portion 15b of the upper core layer 15 is magnetically coupled with a back gap layer 19 composed of a magnetic material formed on the lower core layer 10. The upper surface of the back gap layer 19 is formed so as to be flush with the reference face A in the same manner as is the lower insulating layer 14. In the thin-film magnetic head shown in FIG. 2, the back gap layer is formed of the same material as that for the lower core layer 10 or the upper core layer 15. In addition, the back gap layer 19 may be a single layer film or a multiple-layer film composed of a material differing from that for the lower core layer 10 or the upper core layer 15.

In this connection, the back gap layer 19 may not be formed, and in this case, the base portion 15b of the upper core layer 15 extends to the lower core layer 10 so as to be directly and magnetically coupled with the lower core layer. In addition, as shown in FIG. 1, the width T3 of the front portion 15a of the upper core layer 15 is formed so as to be greater than the track width Tw.

The center 17a and a terminal 17c of the coil layer 17 are electrically connected with back gap layers 22 and 23 composed of the same material as that for the back gap layer 19. The upper surfaces of the back gap layers 22 and 23 are flush with the reference face A in the same manner as is the underlayer insulating layer 14.

In the thin-film magnetic head shown in FIG. 2, the back gap layers 22 and 23 are composed of the same material as that for the lower core layer 10 or the upper core layer 15. In addition, the back gap layers 22 and 23 may be a single layer film or a multiple-layer film composed of a magnetic metal material differing from that for the lower core layer 10 or the upper core layer 15.

Furthermore, the back gap layers 22 and 23 may not be composed of a magnetic material. For example, the back gap layers 22 and 23 may be composed of a material having superior electrical conductivity such as copper which is used for the coil layer 17.

The back gap layers 22 and 23 are electrically connected with lead electrode layers 24 and 25, respectively, with plating under layers 11a provided therebetween. In FIG. 2, the lead electrode layers 24 and 25 are simultaneously formed with the lower core layer 10 and are composed of the same material as that for the lower core layer 10. However, the lead electrode layers 24 and 25 may not be formed of the same material as that for the lower core layer 10.

The back gap layers 22 and 23 may not be formed. In this case, the center 17a and the terminal 17c of the coil layer 17 extend to the lead electrode layers 24 and 25 so as to be directly connected therewith, respectively.

In the present invention, as shown in FIG. 2, the coil layer 17 is preferably composed of an electrically conductive material layer 20 composed of copper or the like and a conductive protecting layer 21 composed of nickel or the like disposed thereon.

When the conductive material layer 20 is composed of copper, the coil resistance can be reduced, and the allowable current can be increased. In this connection, the conductive material layer may be formed of a single layer film or a multiple-layer film composed of at least one of copper and gold.

The conductive protecting layer 21 may be a conductive layer having superior antioxidation characteristics composed of a single layer film or a multiple-layer film comprising at least one element selected from the group consisting of Ni, P, Pd, Pt, B, Au, and W.

As shown in FIG. 2, the coil insulating layer 18 is formed over the coil layer 17, and prior to the formation of the coil insulating layer 18, the upper surface 17b of the coil layer 17 may be exposed to the air in some cases. In this case, when the coil layer 17 is formed of a single conductive material layer composed of copper or the like, the surface thereof is oxidized, and for example, cohesion between the coil layer 17 and the coil insulating layer 18 may be degraded, so that film separation therebetween may occur.

In addition, the formation of the oxide layer would cause instability in coil resistance values of the inductive head, and as a result, recording characteristics thereof may be degraded.

Accordingly, in the present invention, the conductive protecting layer 21 composed of nickel or the like for protecting the conductive material layer 20 composed of copper or the like from oxidation is formed thereon, so that oxidation of the conductive material layer 20 can be adequately prevented when the coil insulating layer 18 is formed.

In this connection, the thickness of the conductive protecting layer 21 is preferably about 0.5 μm. When the conductive protecting layer 21 formed of nickel or the like is exposed to the air, the conductive protecting layer 21 may also be oxidized. However, when the conductive protecting layer 21 is composed of nickel or the like, the oxide layer formed thereon is about 3.0 nm. Accordingly, when in the range of about 200 to 600 nm-thick of conductive protecting layer 21 is formed, even though the oxide layer thereon is removed by ion milling or the like, the conductive material layer 20 is not adversely affected by the ion milling, whereby change in the cross-sectional area of the conductive material layer 20 can be prevented.

In addition, the conductive material layer 20 and the conductive protecting layer 21 are preferably sequentially formed by plating. In the present invention, instead of the conductive protecting layer 21, a protecting layer composed of a non-conductive material such as $SiO_2$ may be formed. In addition, the protecting layer mentioned above may be formed by sputtering or the like.

In FIG. 3, as described above, the front edge face of the Gd determining insulating layer 16 has a curved surface which gradually departs from the ABS surface in the height direction from the bottom to the top of the front edge face (the upward direction), and the back end of the upper magnetic layer 13 is formed on the curved surface. However, the Gd determining insulating layer 16 may be formed in a different shape from that described above.

Figure 4:
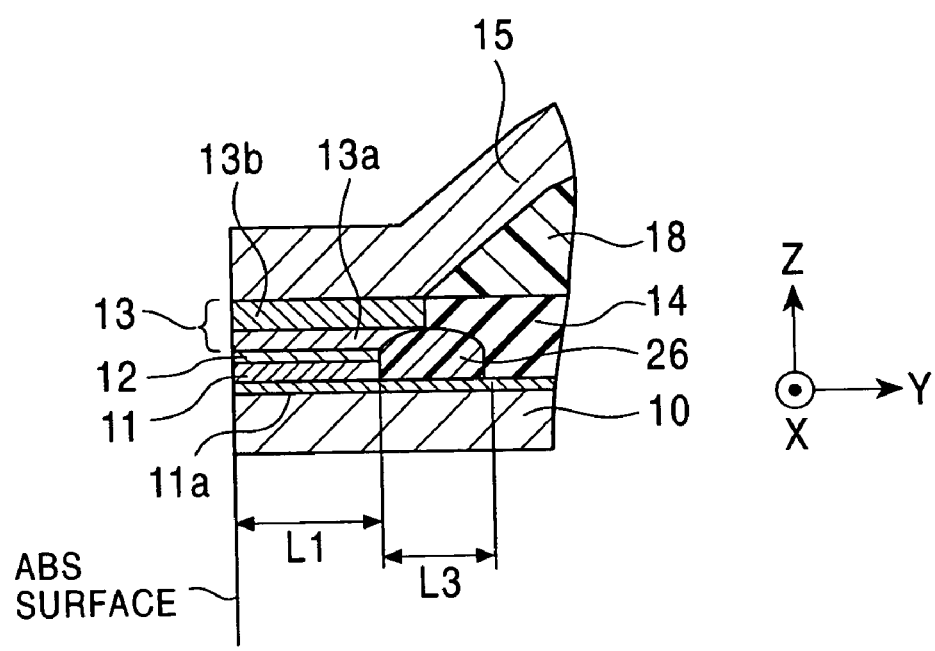
FIG. 4 is a partial cross-sectional view of a thin-film magnetic head in the vicinity of an ABS surface according to a second embodiment of the present invention.

FIG. 4 is a partially enlarged cross-sectional view of a thin-film magnetic head in the vicinity of an ABS surface according to a second embodiment of the present invention, which thin-film magnetic head is equivalent to the embodiment described above except for the shape of the Gd determining insulating layer.

In FIG. 4, the total length L3 of a Gd determining insulating layer 26 in a height direction (the Y direction) is formed so as to be shorter than the total length L2 of the Gd determining insulating layer 16 in the height direction (the Y direction). When the total length L3 of the Gd determining insulating layer 26 in the height direction (the Y direction) is formed shorter, an approximately vertical face 26a thereof to a lower core layer 10 is formed at an ABS surface side. In addition, a gap layer 12 and an interface thereof with an upper magnetic layer 12 are formed from the ABS surface to the vertical face 26a described above. The distance from the ABS surface to the vertical face 26a is set to be L1 equal to the gap depth length. When the vertical face 26a is formed as the front edge face of the Gd determining insulating layer 26, and the position of the back end of the interface between the gap layer 12 and the upper magnetic layer 13 is determined by the vertical face 26a, the gap depth can be precisely set to be the length L1.

The Gd determining insulating layer 26 has a curved face or an inclining face formed so as to gradually approach an upper core layer 15 from the top edge of the vertical face 26a to the top of the face in the height direction (the Z direction), and the back end of the upper magnetic layer 13 is formed on the curved face or the inclining face (hereinafter, the "curved face" and the "inclining face" collectively called the "sloping face").

Accordingly, the area of the interface between the upper magnetic layer 13 and the upper core layer 15 can be increased, so that the leakage flux can be localized in the vicinity of the gap layer.

Figure 5:
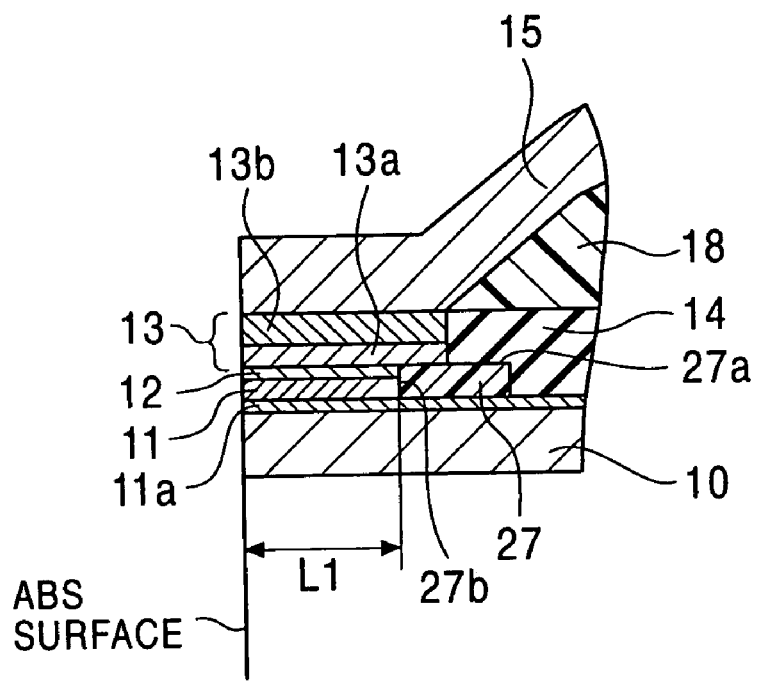
FIG. 5 is a partial cross-sectional view of a thin-film magnetic head in the vicinity of an ABS surface according to a third embodiment of the present invention.

FIG. 5 is a partially enlarged cross-sectional view of a thin-film magnetic head in the vicinity of an ABS surface according to a third embodiment of the present invention. As can be seen in a Gd determining insulating layer 27 shown in FIG. 5, the upper part thereof is a flat face 27a, and the back end of an upper magnetic layer 13 may be disposed on the flat face 27a. In FIG. 5, the front edge face of the Gd determining insulating layer 27 is a vertical face 27b, and the back end in the height direction of an interface between a gap layer 12 and the upper magnetic layer 13 is determined by the vertical face 27b so that the length of a gap depth is set to be L1.

As described above, even when the shape of the Gd determining insulating layer is formed as that of the Gd determining insulating layer 27, the length of the upper magnetic layer 13 can be formed to be longer than those of the gap layer 12 and a lower magnetic layer 11, and the volume of the upper magnetic layer 13 can be increased without increasing the area of the gap layer 12.

Figure 6:
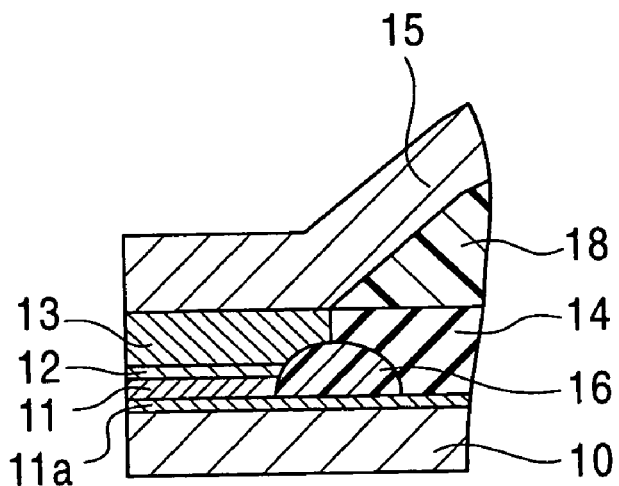
FIG. 6 is a partial cross-sectional view of a thin-film magnetic head in the vicinity of an ABS surface according to a seventh embodiment of the present invention.

In FIGS. 1 to 5, the upper magnetic layer 13 is composed of two films, i.e., a first upper magnetic layer 13a and a second upper magnetic layer 13b, in which the saturated magnetic flux density thereof are different from each other. However, the upper magnetic layer 13 may be formed of a single layer film composed of a single magnetic material as shown in FIG. 6, which shows a cross-sectional area of a thin-film magnetic head according to a seventh embodiment of the present invention.

The preferable shape of the Gd determining insulating layer will be described.

Figure 7:
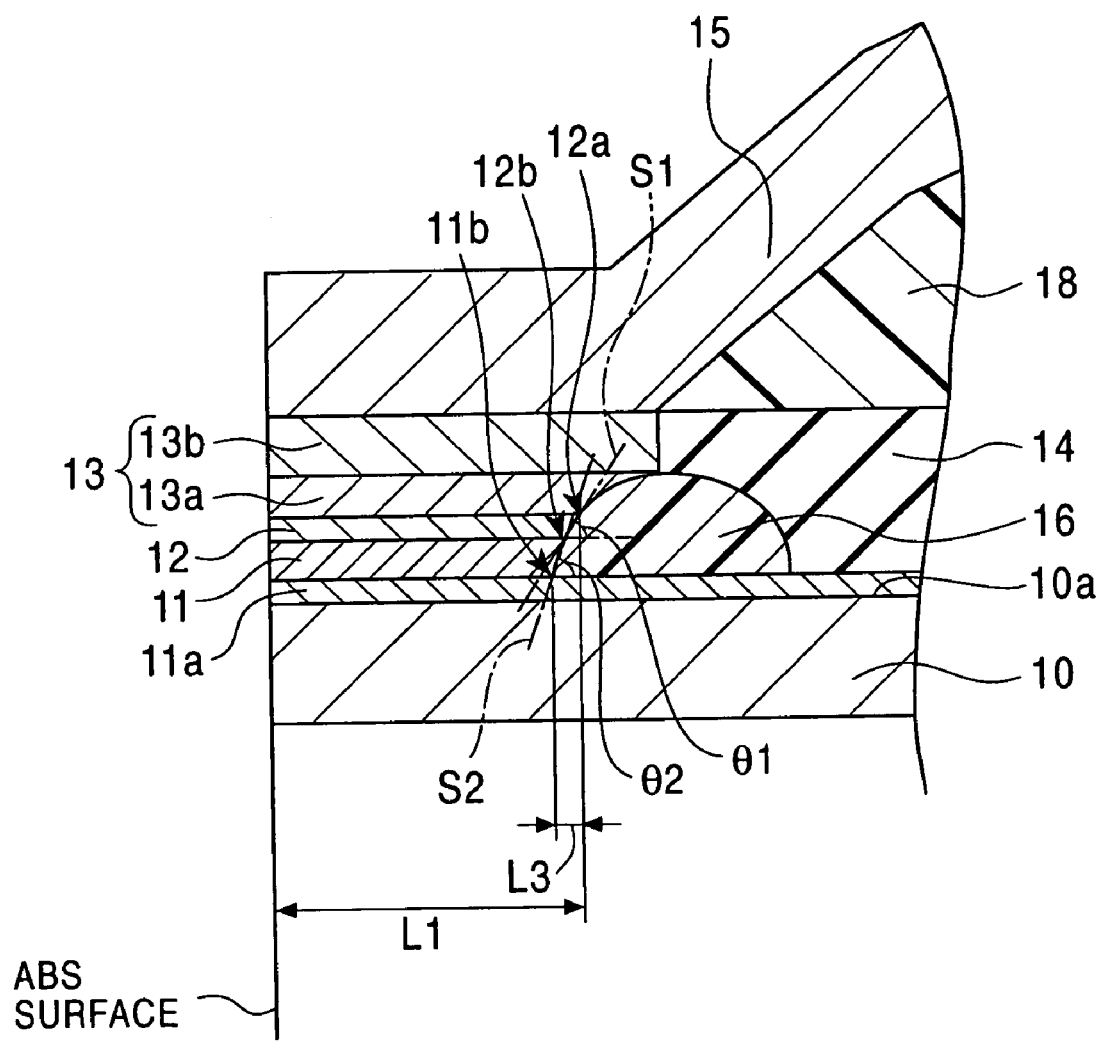
FIG. 7 is an enlarged view of the thin-film magnetic head in the vicinity of the ABS surface in FIG. 3.

FIG. 7 is a partially enlarged cross-sectional view of the thin-film magnetic head shown in FIG. 3 in the vicinity of the ABS surface.

In FIG. 7, an angle $\theta 1$ formed by the upper surface 10a of the lower core layer 10 and a virtual plane S1 including the top edge 12a and the bottom edge 12b of a contacting face between the gap layer 12 and the gap depth determining insulating layer 16 ranges from in the range of about 45 to 90°. In FIG. 7, to facilitate understanding of the figure, the angle $\theta 1$ is shown in the figure as an angle formed by the virtual plane S1 and a plane parallel to the upper surface 10a of the lower core layer 10.

When the angle $\theta 1$ is about 45° or more, as in the embodiment, variation in the gap depth L1 can be suppressed when the thickness of the gap layer 12 varies. In addition, generation of sagging of the gap layer 12 in the vicinity of the contacting face with the Gd determining insulating layer 16 can be prevented.

When the angle $\theta 1$ is about 90° or less, a recess in the upper magnetic layer 13 suppressing the flow of magnetic flux is not formed, so that degradation of recording characteristics of the magnetic head can be prevented.

In this connection, when the angle $\theta 1$ formed by the upper surface 10a of the lower core layer 10 and the virtual plane S1 including the top edge and the bottom edge of the contacting face between the gap layer 12 and the gap depth determining insulating layer 16 is about 80° or more, as described later in a description of a method for manufacturing the thin-film magnetic head of the present invention, resist penetrates into the lower magnetic layer 11 and the gap layer 12, and as a result, the track width of the magnetic head not being controllable. Accordingly, it is preferable that the angle $\theta 1$ be about 80° or less.

In addition, in FIG. 7, an angle $\theta 2$ formed by the upper surface 10a of the lower core layer 10 and a virtual plane S2 including the top edge 12b and the bottom edge 11b of a contacting face between the lower magnetic layer 11 and the gap depth determining insulating layer 16 ranges from in the range of about 45 to 90°. In FIG. 7, the bottom edge of the contacting face between the gap layer 12 and the Gd determining insulating layer 16 and the top edge of the contacting face between the lower magnetic layer 11 and the Gd determining insulating layer 16 overlap each other. In addition, in FIG. 7, to facilitate understanding of the figure, the angle θ2 is shown in the figure as an angle formed by the virtual plane S2 and a plane parallel to the upper surface 10a of the lower core layer 10.

When the angle θ2 is in the range of about 45° or more, variation in the gap depth L1 among products can be suppressed since the distance L3 from the front edge 16a of the Gd determining insulating layer 16 to the contacting face of the gap layer 12 with the Gd determining insulating layer 16 can be shortened.

When the angle θ2 is about 90° or less, a recess in the upper magnetic layer 13 suppressing the flow of magnetic flux is not formed, so that degradation of recording characteristics of the magnetic head can be prevented.

In this connection, when the angle θ2 is about 80° or more, as described later in a description of a method for manufacturing the thin-film magnetic head of the present invention, resist penetrates into the lower magnetic layer 11 and the gap layer 12, and as a result, the track width of the magnetic head not being controllable. Accordingly, it is preferable that the angle θ2 be about 80° or less.

In the magnetic head shown in FIG. 7, since the front edge face of the Gd determining insulating layer 16 at the opposing face (the ABS surface) side is a curved face, the angle θ1 formed by the upper surface 10a of the lower core layer 10 and the virtual plane S1 including the top edge 12a and the bottom edge 12b of the contacting face between the gap layer 12 and the gap depth determining insulating layer 16 is different from the angle θ2 formed by the upper surface 10a of the lower core layer 10 and the virtual plane S2 including the top edge 12b and the bottom edge 11b of the contacting face between the lower magnetic layer 11 and the gap depth determining insulating layer 16.

Both angles θ1 and θ2 may be in the range of about 45 to 90°, or one of the angles θ1 and θ2 may be in the range of about 45 to 90°.

At least one of the angles θ1 and θ2 being in the range of about 45 to 90° is merely a preferable embodiment; however, the ranges of the angles θ1 and θ2 of the present invention are not so limited.

Figure 8:
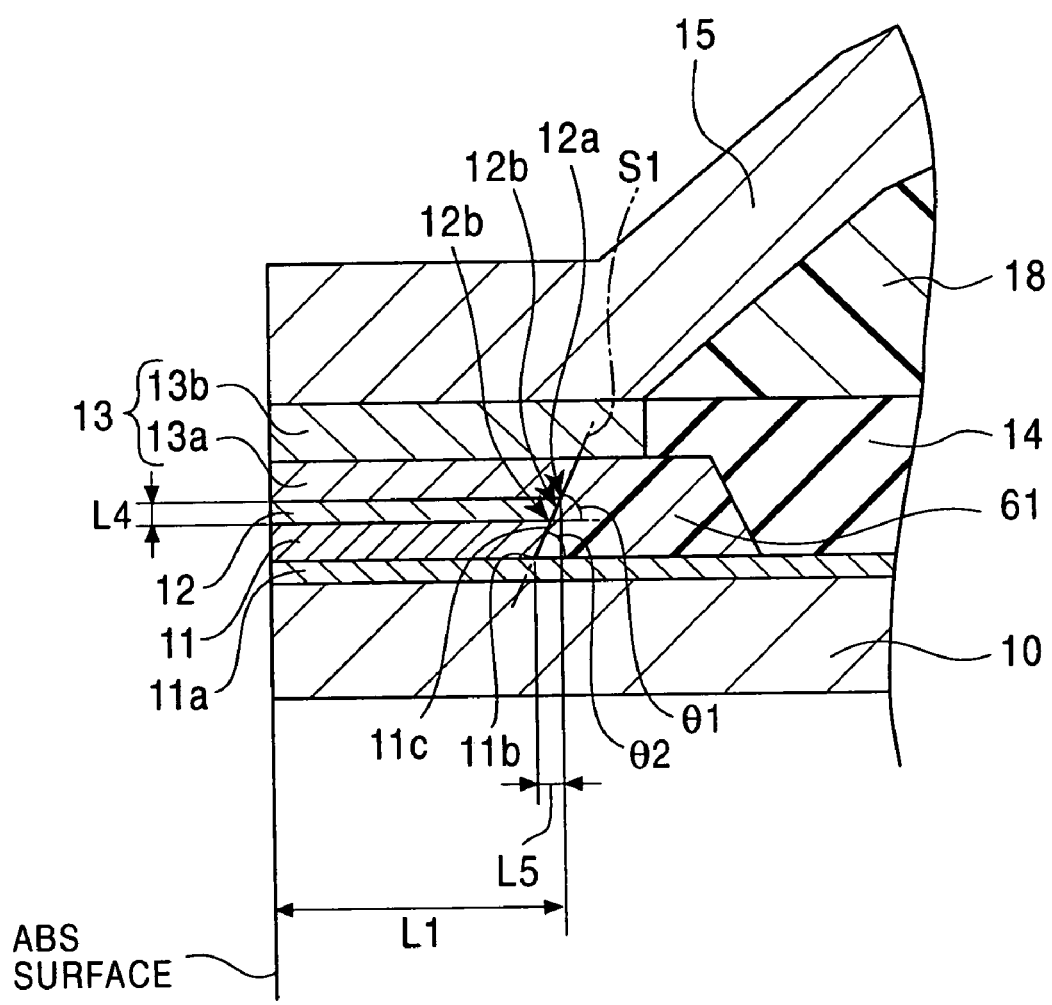
FIG. 8 is a partial cross-sectional view of a thin-film magnetic head in the vicinity of an ABS surface according to a fourth embodiment of the present invention.

FIG. 8 is a partially enlarged cross-sectional view of a thin-film magnetic head in the vicinity of an ABS surface according to a fourth embodiment of the present invention.

In the magnetic head shown in FIG. 8, since a front edge face of a Gd determining insulating layer 61 at an opposing face (the ABS surface) side is an inclining face, an angle θ1 formed by an upper surface 10a of a lower core layer 10 and a virtual plane S3 including a top edge 12a and a bottom edge 12b of a contacting face 12c between a gap layer 12 and the gap depth determining insulating layer 61 is equal to an angle θ2 formed by the upper surface 10a of the lower core layer 10 and a virtual plane S3 including a top edge 12b and a bottom edge 11b of a contacting face 11c between a lower magnetic layer 11 and the gap depth determining insulating layer 61.

In FIG. 8, to facilitate understanding of the figure, the angles θ1 and θ2 are shown in the figure as angles formed by the virtual plane S3 and a plane parallel to the upper surface 10a of the lower core layer 10.

In the embodiment, both angles θ1 and θ2 are in the range of about 45 to 90°.

When the angle θ1 is about 45° or more, variation in a gap depth L1 can be suppressed when the thickness L4 of the gap layer 12 varies. In addition, sagging formation in the gap layer 12 in the vicinity of the contacting face 12c with the Gd determining insulating layer 61 can be prevented.

When the angles θ1 and θ2 are about 90° or less, since a recess in an upper magnetic layer 13 suppressing flow of magnetic flux is not formed, degradation of recording characteristics of the magnetic head can be prevented.

When the angles θ1 and θ2 are about 80° or more, as described later in a description of a method for manufacturing the thin-film magnetic head of the present invention, resist penetrates into the lower magnetic layer 11 and the gap layer 12, and as a result, the track width of the magnetic head not being controllable. Accordingly, it is preferable that the angles θ1 and θ2 be about 80° or less.

When the angle θ2 is about 45° or more, a distance L5 from a front edge of the Gd determining insulating layer 61 to the contacting face of the gap layer with the Gd determining insulating layer 61 can be shortened, so that variation in the gap depth L1 among products can be suppressed.

In this connection, the Gd determining insulating layers 16, 26, 27, and 61 may be formed by using an ultraviolet photocurable resin as described later in a description of a manufacturing method. When the Gd determining insulating layers 16, 26, 27, and 61 are formed by an ultraviolet photocurable resin, the front edge surfaces thereof are easily formed in a predetermined shape.

Alternatively, the Gd determining insulating layers 16, 26, 27, and 61 may be formed of an inorganic material. When the Gd determining insulating layers 16, 26, 27, and 61 are formed of an inorganic material, the Gd determining insulating layer can be precisely processed, and hence, variation in the gap depth and the thickness of the gap layer can be suppressed.

As a material for forming the Gd determining insulating layers 16, 26, 27, and 61, for example, $SiO_2$ and $Al_2O_3$ may be used.

In the thin-film magnetic head of the embodiment of the present invention shown in FIG. 2, the back gap layer 19 for magnetically coupling the upper core layer 15 and the lower core layer 10 is formed of the same material as is used for the lower core layer 10 and the upper core layer 15.

In addition, the back gap layers 22 and 23 for connecting the center 17a and the terminal 17c of the coil layer 17 with the lead electrode layers 24 and 25, respectively, are formed of the same material as is used for the lower core layer 10 and the upper core layer 15.

Figure 9:
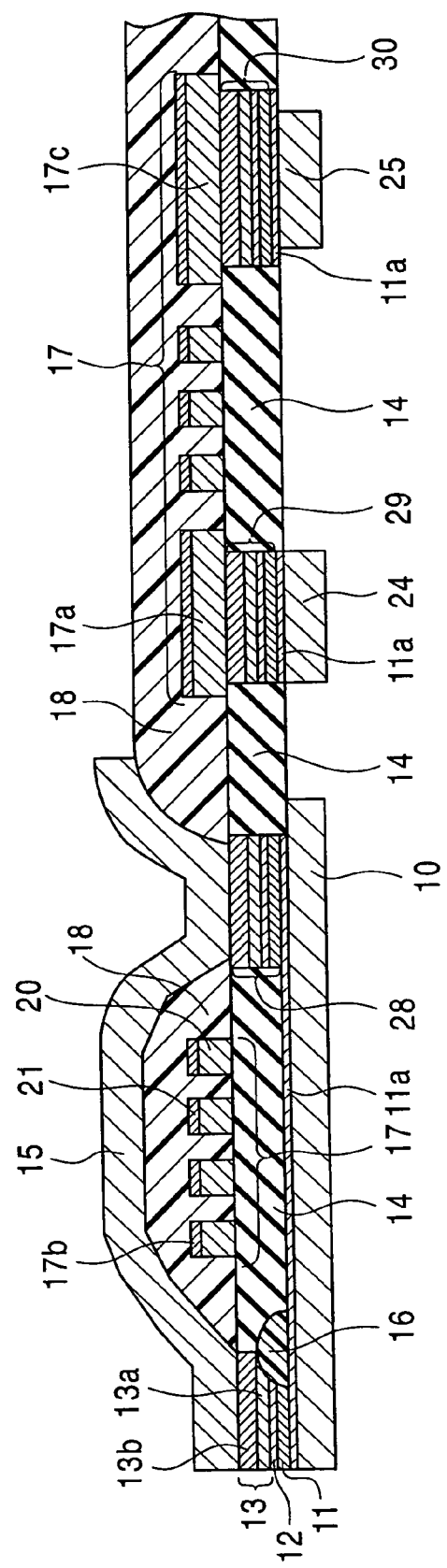
FIG. 9 is a longitudinal cross-sectional view of a thin-film magnetic head according to a fifth embodiment of the present invention.

FIG. 9 is a longitudinal cross-sectional view of a thin-film magnetic head according to a fifth embodiment of the present invention. The thin-film magnetic head in FIG. 9 is equivalent to that shown in FIG. 2 except for back gap layers 28, 29, and 30.

The back gap layers 28, 29, and 30 in FIG. 9 are composed of a multi-layer film having the same structure as a laminate composed of a lower magnetic layer 11, a gap layer 12, and an upper magnetic layer 13. Accordingly, as described later in a description of a manufacturing method therefor, since the back gap layers 28, 29, and 30 can be simultaneously formed during the formation of the lower magnetic layer 11, the gap layer 12, and the upper magnetic layer 13, the number of manufacturing steps can be reduced.

However, the thin-film magnetic head shown in FIG. 2 is superior to the thin-film magnetic head shown in FIG. 9 in terms of magnetic and electric characteristics, in which the back gap layers 19, 22, and 23 are formed of a single layer film composed of the same material as is used for the lower core layer 10 or the upper core layer 15.

Figure 10:
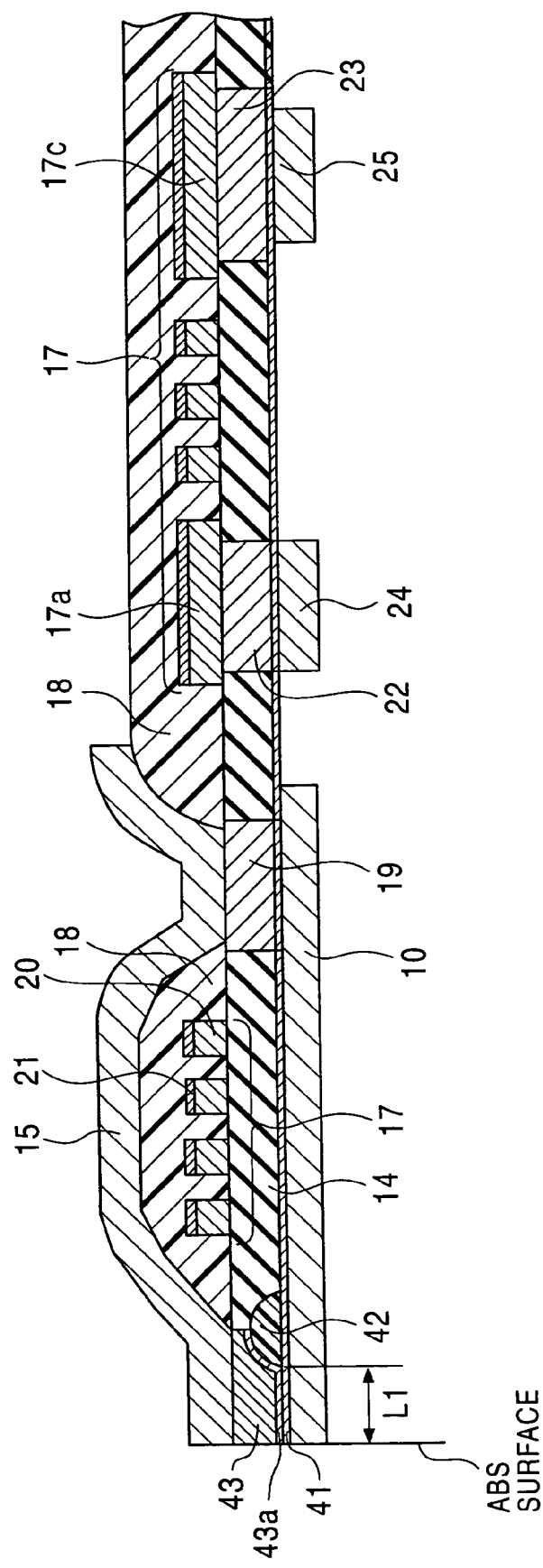
FIG. 10 is a longitudinal cross-sectional view of a thin-film magnetic head according to a sixth embodiment of the present invention.

FIG. 10 is a longitudinal cross-sectional view of a thin-film magnetic head according to a sixth embodiment of the present invention.

In the embodiment, a gap layer 41 is formed directly on a lower core layer 10. The gap layer 41 is composed of an insulating material such as $Al_2O_3$ and $SiO_2$. A Gd determining insulating layer 42 is formed on the gap layer 41 at a predetermined distance extending from an ABS surface. A front edge face of the Gd determining insulating layer 42 at an ABS surface side restricts the back end of an interface between the gap layer 41 and an upper magnetic layer 43, so that a gap depth is determined. In FIG. 10, the length of the gap depth is set to be L1.

A plating underlayer 43a is formed on the front edge face of the Gd determining insulating layer 43 and on the gap layer 41 disposed between the Gd determining insulating layer 42 and the ABS surface, and the upper magnetic layer 43 is then formed on the plating underlayer 43a by plating.

The upper magnetic layer 43 is magnetically coupled at the upper surface thereof with an upper core layer 15.

The thin-film magnetic head of the embodiment is equivalent to those shown in FIGS. 1 to 9 except that the gap layer 41 and the upper magnetic layer 43 are not sequentially formed by plating.

In the thin-film magnetic head in FIG. 10, the interface between the upper core layer 15 and the upper magnetic layer 43 has an area wider than that of a conventional one, and the volume of the upper magnetic layer 43 is also increased. Accordingly, restriction of magnetic flux flowing through the upper core layer 15 at the interface mentioned above can be suppressed. In addition, since the magnetic flux easily flows in the upper magnetic layer 43, saturation of the magnetic flux before reaching the gap layer 41 can also be prevented.

However, as shown in FIG. 10, when the plating underlayer 43a is formed on the front edge face of the Gd determining insulating layer 43 and on the gap layer 41 formed between the Gd determining insulating layer 42 and the ABS surface, and when a resist layer to be used for patterning the upper magnetic layer 43 is formed on the plating underlayer 43a and is subsequently exposed and developed into the shape of the upper magnetic layer 43, there is a problem in that diffused reflection is likely to occur due to the existence of the plating underlayer 43a. Accordingly, due to the diffused reflection mentioned above, it is difficult to form the upper magnetic layer 43 provided with an accurate pattern. Therefore, as the thin-film magnetic heads shown in FIGS. 1 to 9, it is preferable in terms of pattern accuracy that the plating underlayer 11a be formed on the lower core layer 10, that the Gd determining insulating layer 16, 26, or 27 be formed on the plating underlayer 11a, and then, that the lower magnetic layer 11, the gap layer 12, and the upper magnetic layer 13 be sequentially formed by plating.

FIGS. 11 to 18 are cross-sectional views of the thin-film magnetic head shown in FIG. 2 showing sequential manufacturing steps therefor.

Figure 11:
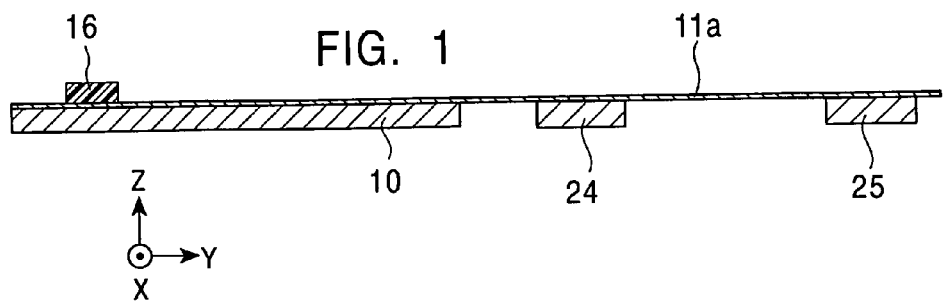
FIG. 11 is a view showing a manufacturing step for the thin-film magnetic head in FIG. 2 of the present invention.

In FIG. 11, the plating underlayer 11a composed of a magnetic material such as a permalloy is formed on the lower core layer 10, and then the Gd determining insulating layer 16 composed of an ultraviolet photocurable resin or the like is formed at a predetermined position on the plating underlayer 11a. In addition, the lead electrode layers 24 and 25 for the coil layer are simultaneously formed with the lower core layer 10.

In order to form the Gd determining insulating layer 16, there are steps of, for example, forming a rectangular resist layer composed of an ultraviolet photocurable resin as shown in FIG. 11, and then post-baking (annealing) so that the rectangular resist layer sags, whereby the curved front edge face of the Gd determining insulating layer 16 is formed so as to gradually depart from the opposing face (the ABS surface) in the height direction from the bottom to the top of the front edge face as in the Z direction in the figure. After annealing, the Gd determining insulating layer 16 is exposed to ultraviolet light so as to be cured. The gap depth is determined by the length L1 of the upper surface of the gap layer 12 formed between the front edge face of the Gd determining insulating layer 16 and the ABS surface.

Figure 13:
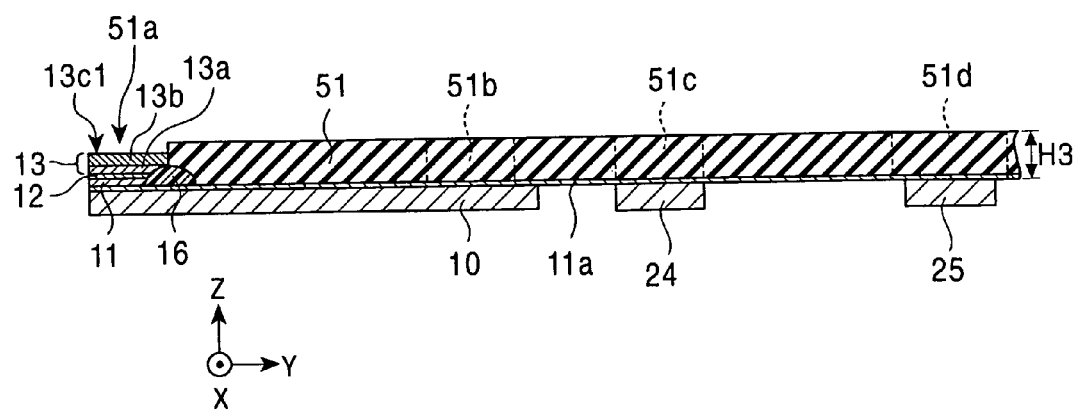
FIG. 13 is a view showing a manufacturing step following the step shown in FIG. 12.
Figure 19:
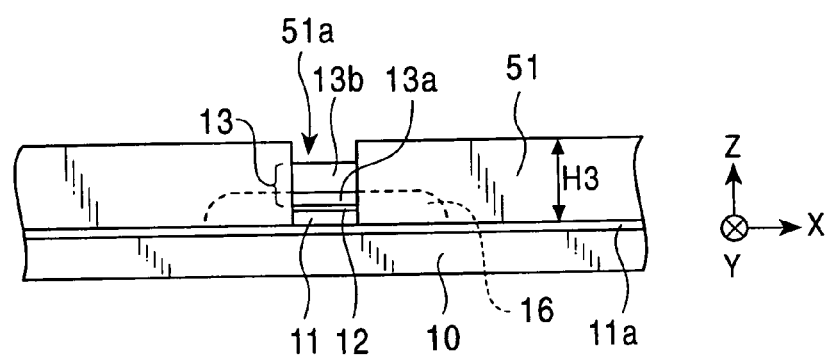
FIG. 19 is a partial front view of the thin-film magnetic head in the manufacturing step shown in FIG. 13.

Next, as shown in FIG. 13, a resist layer 51 is formed on the lower core layer 10 by coating, and a groove 51a is formed in the resist layer 51 by exposure and development thereof, in which the groove 51a has a predetermined length extending from the ABS surface in the height direction (the Y direction in the figure) and a predetermined width smaller than the width of the Gd determining insulating layer 16 in the track width direction (the X direction in the figure) as shown in FIG. 19. In the groove 51a, the lower magnetic layer 11, the gap layer 12, and the upper magnetic layer 13 are sequentially formed by plating.

The thickness H3 of the resist layer 51 must be formed to be at least thicker than the total thickness H2 of the lower magnetic layer 11, the gap layer 12, and the upper magnetic layer 13 in the finished thin-film magnetic head shown in FIG. 1.

A nonmagnetic metal material capable of forming the gap layer 12 by plating is preferably at least one selected from the group consisting of NiP, NiPd, NiW, NiMo, NiRh, Au, Pt, Rh, Pd, Ru, and Cr.

When the nonmagnetic metal material is NiP, in order that the gap layer be a nonmagnetic layer, it is preferable that the P content in the NiP measured by inductively coupled plasma emission spectrometry be 11 to 14 mass percent.

It is more preferable that the P content in the NiP measured by inductively coupled plasma emission spectrometry be in the range of about 12.5 to 14 mass percent, since the NiP remains in a nonmagnetic state even when subjected to heating at about 200° C. or more.

The lower magnetic layer may not be formed. In FIG. 13, the upper magnetic layer 13 is composed of a two-layer film having a first upper magnetic layer 13a and a second upper magnetic layer 13b. The first magnetic layer 13a is formed of a magnetic material having a saturated magnetic flux density higher than that of the second magnetic layer 13b. When the upper magnetic layer is composed of multiple layers so that a layer closer to the gap layer 12 has a higher magnetic flex density, as described above, the magnetic flux flowing from the upper core layer 15 is easily localized in the vicinity of the gap layer, and hence, the recording density can be improved.

However, the upper magnetic layer 13 may be composed of a single layer film, or a multiple-layer film having at least three layers.

As shown in FIG. 7, the angle θ1 formed by the upper surface 10a of the lower core layer 10 and the virtual plane S1 including the top edge 12a and the bottom edge 12b of the contacting face between the gap layer 12 and the gap depth determining insulating layer 16 preferably ranges from in the range of about 45 to 90°, and the angle θ2 formed by the upper surface 10a of the lower core layer 10 and the virtual plane S2 including the top edge 12b and the bottom edge 11b of the contacting face between the lower magnetic layer 11 and the gap depth determining insulating layer 16 preferably ranges from in the range of about 45 to 90°.

Figure 12:
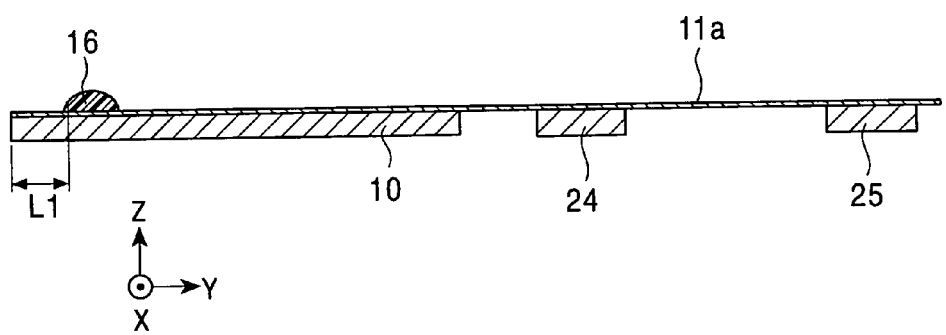
FIG. 12 is a view showing a manufacturing step following the step shown in FIG. 11.

In the present invention, in a step in FIG. 12, by appropriately setting post-baking (heating) conditions for the resist layer, the shape of the front edge face of the Gd determining insulating layer 16 can be adjusted, and hence, the angles θ1 and θ2 are set to be in the range of about 45 to 90°.

In this connection, in a step in FIG. 13, the upper surface 13c1 of the upper magnetic layer 13 is preferably formed so as to be higher than an upper surface 13c2 of the upper magnetic layer 13 formed in the following step shown in FIG. 16.

After forming the lower magnetic layer 11, the gap layer 12, and the upper magnetic layer 13 by plating, openings 51b, 51c, and 51d are formed in a posterior portion of the resist layer 51 in the height direction (the Y direction in the figure) while the upper surface of the upper magnetic layer 13 is protected. Subsequently, the back gap layers 19, 22, and 23 are formed in the openings 51b, 51c, and 51d by plating.

Figure 14:
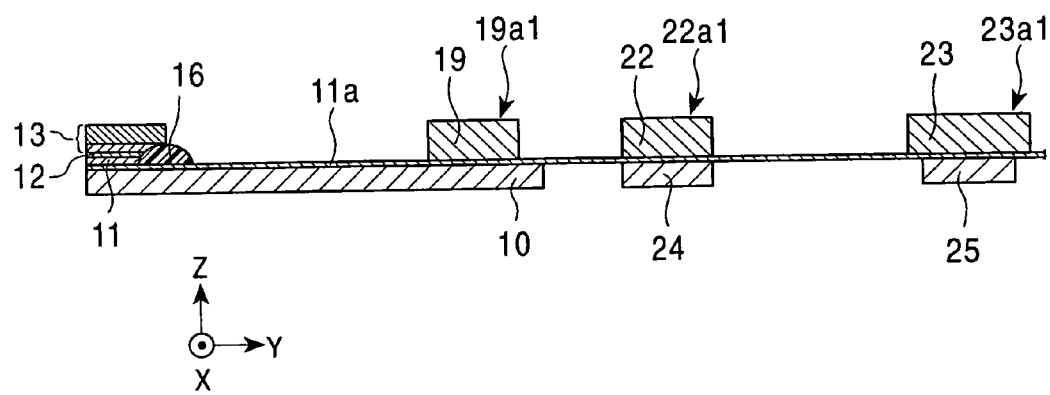
FIG. 14 is a view showing a manufacturing step following the step shown in FIG. 13.

In a step shown in FIG. 14, the resist is removed, the lower magnetic layer 11, the gap layer 12, and the upper magnetic layer 13 are sequentially formed on the lower core layer 10 in the vicinity of the ABS surface, and the back gap layers 19, 22, and 23 are formed at positions extending from the ABS surface in the height direction.

In FIG. 14, the upper surfaces 19a1, 22a1, and 23a1 of the associated back gap layers 19, 22, and 23, are preferably formed so as to be higher than upper surfaces 19a2, 22a2, and 23a2 of the associated back gap layers 19, 22, and 23 in the following step shown in FIG. 16.

In the manufacturing method described above, the lower magnetic layer 11, the gap layer 12, and the upper magnetic layer 12 are formed, the openings 51b, 51c, and 51d are then formed in the resist layer 51, and subsequently, the back gap layers 19, 22, and 23 are formed by plating in the openings 51b, 51c, and 51d, whereby the manufacturing method is more complicated than that for the thin-film magnetic head shown in FIG. 3 described later. However, since the back gap layers 19, 22, and 23 may be formed of a single layer film composed of the same material as is used for the lower core layer 10 or the upper core layer 15, the back gap layers 19, 22, and 23 do not have a layer composed of the same material as is used for the gap layer 12 in the thin-film magnetic head in FIG. 3, so that a thin-film magnetic head having superior magnetic and electric characteristics can be manufactured.

The back gap layers 19, 22, and 23 may be formed of a single layer film or a multiple-layer film composed of a magnetic metal material differing from that for the lower core layer 10 or the upper core layer 15.

The two side faces (side faces in the X direction in the figure) of the lower magnetic layer 11, the gap layer 12, and the upper magnetic layer 13 shown in FIG. 14 may be polished by ion milling from the track width direction (the X direction in the figure) so that the width thereof is smaller. In this case, the width of the upper magnetic layer 13 after polishing by ion milling is set to be the track width Tw. The width of the upper magnetic layer 13 is formed to be smaller than that of the lower core layer 10. In this ion milling step, the upper surfaces of the core layer 10 extending from the base edges of the lower magnetic layer 11 toward the track direction (the X direction in the figure) are also polished, so that the inclining surfaces 10b and 10b are formed as the upper surfaces of the lower core layer 10.

Furthermore, the plating underlayer 11a connecting the lower core layer 10 and the lead electrode layers 24 and 25 is removed.

Figure 15:
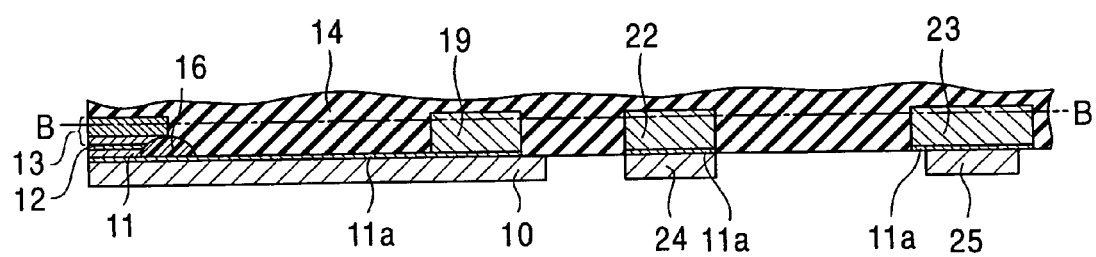
FIG. 15 is a view showing a manufacturing step following the step shown in FIG. 14.

Next, in a step shown in FIG. 15, the underlayer insulating layer 14 composed of an insulating material is continuously formed by sputtering on the upper magnetic layer, the lower core layer 10, the back gap layers 19, 22, and 23, and a posterior region thereof in the height direction.

In the present invention, the underlayer insulating layer 14 is formed by sputtering an inorganic material. The inorganic material is preferably at least one selected from the group consisting of $Al_2O_3$, $SiO_2$, $Ta_2O_5$, and AlN.

As shown in FIG. 15, the upper surface of the underlayer insulating layer 14 is polished to the line B—B by using chemical mechanical polishing (CMP) or the like. FIG. 16 shows a state in which the underlayer insulating layer 14 is polished.

Figure 16:
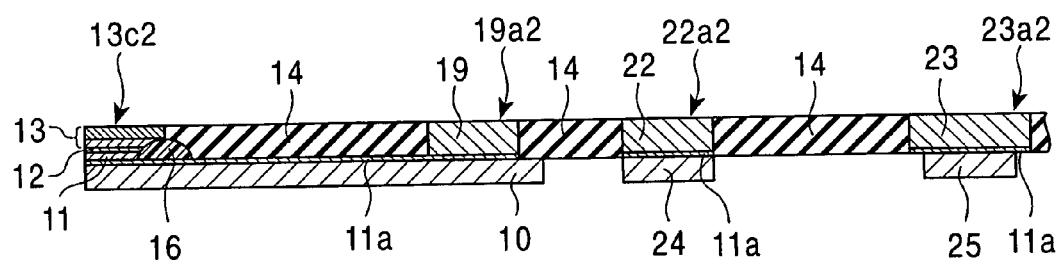
FIG. 16 is a view showing a manufacturing step following the step shown in FIG. 15.

By polishing the underlayer insulating layer 14 to the line B—B, as shown in FIG. 16, the upper surface 13c2 of the upper magnetic layer 13 is exposed, and the upper surfaces 19a2, 22a2, and 23a2 of the back gap layers 19, 22, and 23, respectively, are also exposed at the same level as the upper surface 13c2.

The reason the upper surfaces 19a2, 22a2, and 23a2 of the back gap layers 19, 22, and 23, respectively, are exposed at the same level as the upper surface 13c2 of the upper magnetic layer 13 is that the upper surfaces 19a1, 22a1, and 23a1 of the back gap layers 19, 22, and 23, respectively, in FIG. 14 are formed so as to be higher than the upper surfaces 19a2, 22a2, and 23a2 in FIG. 16.

Accordingly, when the polishing is complete in the step shown in FIG. 16, the surface of the underlayer insulating layer 14 and the upper surfaces 19a2, 22a2, and 23a2 of the back gap layers 19, 22, and 23, respectively, can be positioned at the same level as the upper surface 13c2 of the upper magnetic layer 13.

Figure 17:
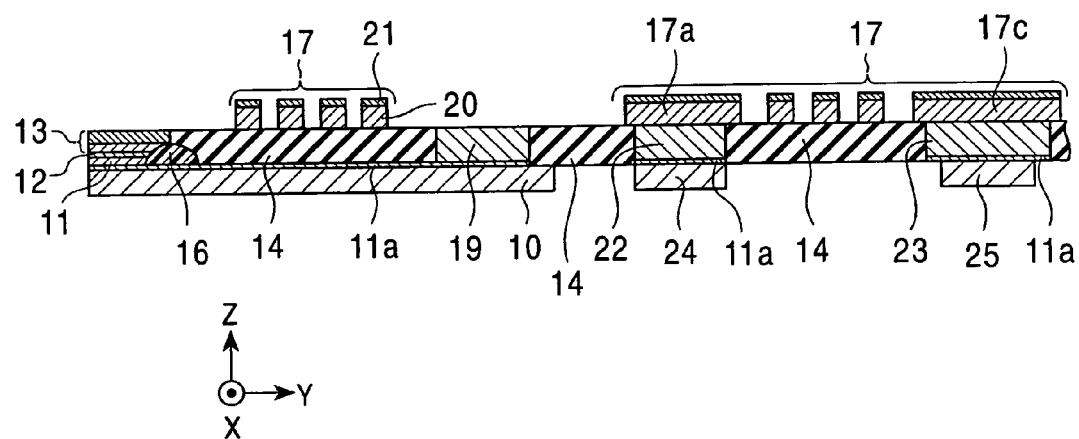
FIG. 17 is a view showing a manufacturing step following the step shown in FIG. 16.

Next, as shown in FIG. 17, the spiral coil layer 17 having the spiral center 17a is formed on the underlayer insulating layer 14.

In the present invention, as shown in FIG. 17, the coil layer 17 is preferably composed of an electrically conductive material layer 20 and a conductive protecting layer 21 formed thereon. The electrical conductive material layer 20 is formed of a single layer film or a multiple-layer film comprising at least one of Cu and Au, and the conductive protecting layer 21 is formed of a single layer film or a multiple-layer film comprising at least one element selected from the group consisting of Ni, P, Pd, Pt, B, and W.

The reason the conductive protecting layer 21 is formed on the electrically conductive material layer 20 is to protect the electrically conductive material layer 20 from oxidation. In this connection, the conductive protecting layer is oxidized at the surface thereof when exposed to the air, but the oxide layer formed thereon is very thin, for example, about 3.0 nm. Consequently, when the conductive protecting layer 21 is polished by ion milling or the like, since the thickness thereof is in the range of about 200 to 600 nm, the electrically conductive material layer 20 is not adversely affected by ion milling, so that the volume of the electrically conductive material layer 20 is not changed. Accordingly, the constant coil resistance and allowable current of the coil layer 17 can be maintained.

In the present invention, the upper surface of the underlayer insulating layer 14 is positioned at the same level as the upper surface 13c2 of the upper magnetic layer 13, the planarized surface extends from the upper surface 13c2 of the upper magnetic layer 13 toward the height direction (the Y direction in the figure), and the coil layer 17 can be formed on the planarized surface, whereby the coil layer 17 having superior pattern accuracy can be formed.

In the present invention, the center 17a and the terminal 17c of the coil layer 17 can be directly contacted electrically to the back gap layers 22 and 23, respectively.

In the case in which the back gap layers 22 and 23 are not formed, and the lead electrode layers 24 and 25 are not exposed, openings must be formed by etching or the like in the underlayer insulating layer 14 covering the lead electrode layers 24 and 25.

In the present invention, since the upper surfaces 22a2 and 23a2 of the associated back gap layers 22 and 23 are exposed at the same level as the upper surface 13c2 of the upper magnetic layer 13 in the step in FIG. 16, the center 17a and the terminal 17c of the coil layer 17 can be directly formed on the back gap layers 22 and 23, respectively, so that the manufacturing process can be simplified.

Figure 18:
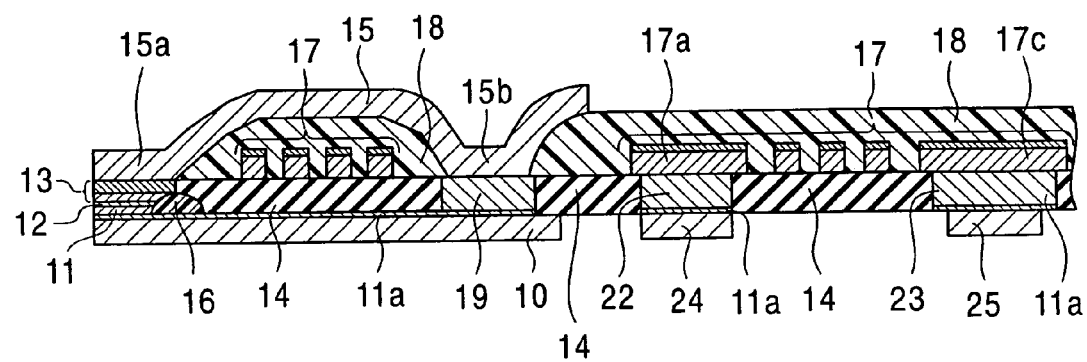
FIG. 18 is a view showing a manufacturing step following the step shown in FIG. 17.

Next, in a step shown in FIG. 18, the coil insulating layer 18 composed of an organic insulating material, such as a resist or a polyimide resin, is formed so as to cover the coil layer 17, and the upper core layer 15 provided with a pattern is formed on the coil insulating layer 18 by a common method, such as flame plating. As shown in FIG. 18, the upper core layer 15 is formed so as to be in contact with the upper surface of the upper magnetic layer 13 at the front portion 15a of the upper core layer 15 and so as to be magnetically coupled with the back gap layer 19 formed on the lower core layer 10 at the base portion 15b of the upper core layer 15.

In the case in which the back gap layer 19 is not formed, an opening must be formed by etching or the like in the underlayer insulating layer 14 covering the lower core layer 10.

In the present invention, since the upper surface 19a2 of the back gap layer 19 is exposed at the same level as the upper surface 13c2 of the upper magnetic layer 13 in the step shown in FIG. 16, the base portion 15b of the upper core layer 15 can be directly formed on the back gap layer 19, so that the manufacturing process can be simplified.

In addition, in the present invention, in the step shown in FIG. 14, the two side faces in the track width direction of the lower magnetic layer 11, the gap layer 12, and the upper magnetic layer 13 sequentially formed on the lower core layer 10 may be polished by ion milling. In this case, when the width (the track width Tw) of the upper magnetic layer 13 may be formed to be smaller, a thin-film magnetic head capable of meeting the desire for narrower track configuration can be manufactured. In this step, a track of not more than about 0.4 µm can be formed.

When the track width is formed to be about 0.5 µm or more, the track width can be determined by the width of the groove 51a formed by exposing and developing the resist layer 51 shown in FIGS. 13 and 19, so that the two side faces in the track width direction of the lower magnetic layer 11, the gap layer 12, and the upper magnetic layer 13 are not required to be polished.

In particular, the track width Tw is preferably formed to be about 0.7 µm or less, and more preferably, about 0.4 µm or less.

Figure 20:
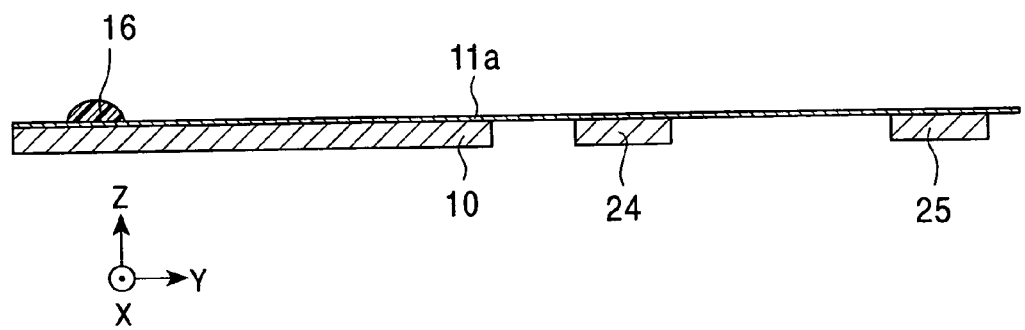
FIG. 20 is a view showing a manufacturing step for the thin-film magnetic head shown in FIG. 9.
Figure 21:
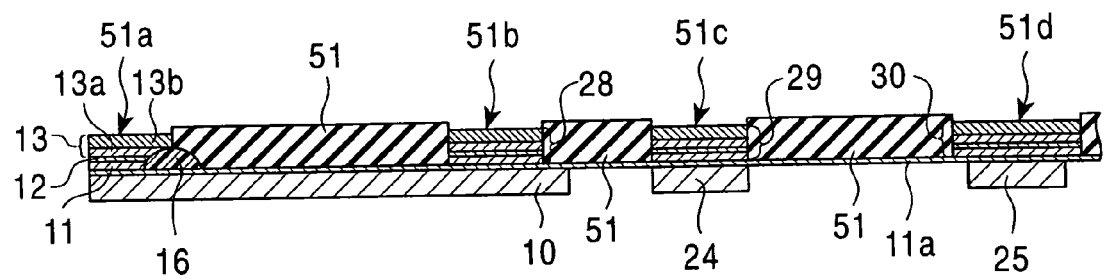
FIG. 21 is a view showing a manufacturing step following the step shown in FIG. 20.

FIGS. 20 and 21 are cross-sectional views of the thin-film magnetic head shown in FIG. 9 for describing the manufacturing steps therefor.

As shown in FIG. 20, the plating underlayer 11a composed of a magnetic material such as a permalloy is formed on the lower core layer 10, and the Gd determining insulating layer 16 composed of a resist or the like is formed on a predetermined position on the plating underlayer 11a. In addition, the lead electrode layers 24 and 25 for the coil layer are simultaneously formed with the lower core layer 10.

In order to form the Gd determining insulating layer 16, there are steps of, for example, forming a rectangular resist layer composed of an ultraviolet photocurable resin as shown in FIG. 11, and sagging the rectangular resist layer by post-baking (heating), whereby, as shown in FIG. 20, the curved front edge face of the Gd determining insulating layer 16 is formed so that the front edge face gradually departs from the ABS surface in the height direction from the bottom at the lower core layer 10 to the top of the front edge face, as indicated by the Z direction in the figure. After annealing, the Gd determining insulating layer 16 is exposed to ultraviolet light so as to be cured.

Next, as shown in FIG. 21, the resist layer 51 is formed by coating on the lower core layer 10, and the groove 51a is formed in the resist layer 51 by exposure and development thereof, in which the groove 51a has a predetermined length extending from the ABS surface in the height direction (the Y direction in the figure) and a predetermined width smaller than the width of the Gd determining insulating layer 16 in the track width direction (the X direction in the figure) as shown in FIG. 19. In addition, when the groove 51a is formed, the openings 51b, 51c, and 51d are simultaneously formed in the back portion of the resist layer 51 in the height direction.

Next, when the lower magnetic layer 11, the gap layer 12, and the upper magnetic layer 13 are sequentially formed by plating in the groove 51a, the back gap layers 28, 29, and 30 are simultaneously formed. The back gap layers 28, 29, and 30 are formed of the same multiple-layer film as a laminate formed of the lower magnetic layer 11, the gap layer 12, and the upper magnetic layer 13.

After removing the resist layer 51, the thin-film magnetic head in FIG. 9 is obtained through the same steps as those described using FIGS. 15 to 18.

When the back gap layers 28, 29, and 30 are formed simultaneously with the lower magnetic layer 11, the gap layer 12, and the upper magnetic layer 13 which are sequentially formed by plating, the number of the manufacturing steps can be reduced compared to those in which, after forming the lower magnetic layer 11, the gap layer 12, and the upper magnetic layer 13, the back gap layers are formed by plating in the openings 51b, 51c, and 51d formed in the resist layer 51.

As a method for forming the Gd determining insulating layer 16, the following method may be used in addition to the method described above, in which a rectangular resist layer composed of an ultraviolet photocurable resin is formed and is then sagged by post-baking (heating).

Figure 22:
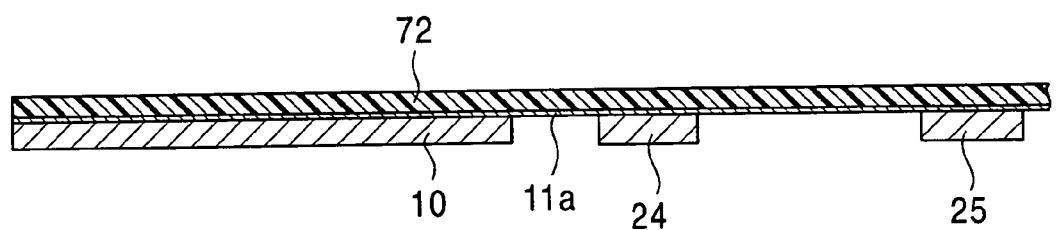
FIG. 22 is a view showing a manufacturing step for a thin-film magnetic head according to another embodiment of the present invention.
Figure 23:
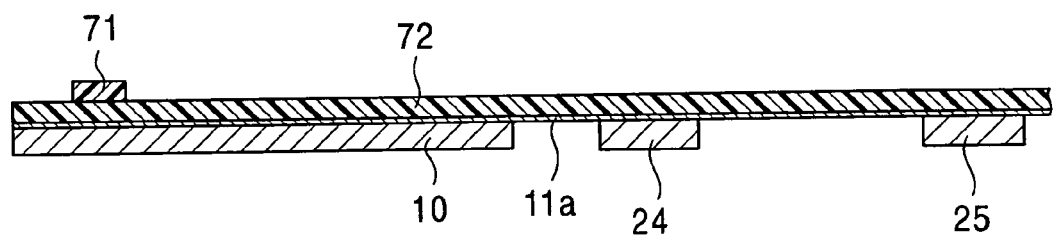
FIG. 23 is a view showing a manufacturing step following the step shown in FIG. 22.

As shown in FIG. 22, an inorganic insulating layer 72 to be a Gd determining insulating layer is formed on a lower core layer 10 by a film formation method, such as sputtering or deposition, and a resist layer 71 is formed on the inorganic insulating layer 72 (see FIG. 23). The inorganic insulating layer 72 may be formed of $SiO_2$, $Al_2O_3$, or the like.

Figure 24:
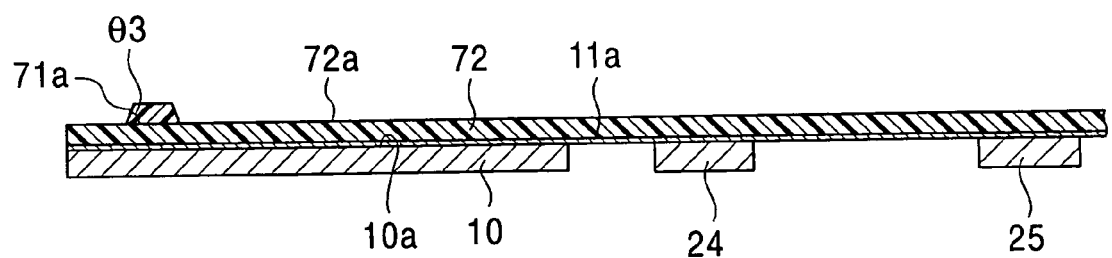
FIG. 24 is a view showing a manufacturing step following the step shown in FIG. 23.

Next, the resist layer 71 is heated so as to form a sloping face as that formed in the inorganic insulating layer 72 (see FIG. 24).

In the embodiment, the inorganic insulating layer 72 is formed so that the upper surface 10a of the lower core layer 10 and the upper surface 72a of the inorganic insulating layer 72 are parallel to each other and so that an angle θ3 formed by the upper surface 72a of the inorganic insulating layer 72 and a front edge face 71a of the resist layer 71 is 45 to 90°.

Figure 25:
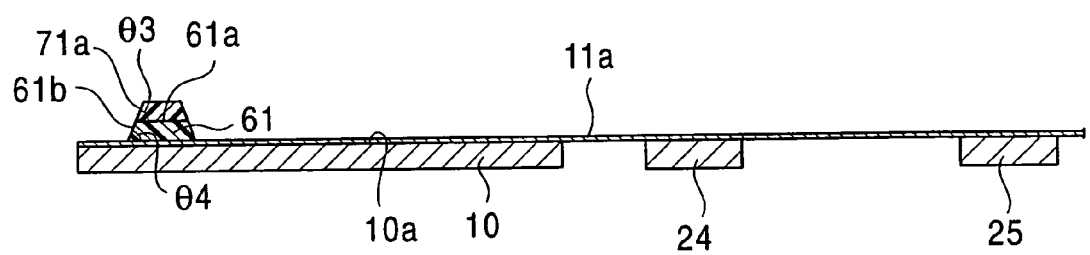
FIG. 25 is a view showing a manufacturing step following the step shown in FIG. 24.

In addition, the inorganic insulating layer 72 is etched by dry etching, such as ion milling and reactive ion etching (RIE), using the resist layer 71 as a mask, whereby the Gd determining insulating layer 61 is formed (see FIG. 25). The front edge of the inorganic insulating layer 72 covered with the resist layer 71 is etched so as to have the same angle as that at the front edge face of the resist layer 71. Accordingly, an angle θ4 formed by the front edge face 61b of the Gd determining insulating layer 61 formed by dry etching and the upper surface 10a of the lower core layer 10 is in the range of about 45 to 90°.

After removing the resist layer 71 on the Gd determining insulating layer 61 (see FIG. 26), through steps similar to those shown in FIGS. 13 to 18, a lower magnetic layer 11, a gap layer 12, an upper magnetic layer 13, back gap layers 19, 22, and 23, a coil layer 17, and an upper core layer 15 are formed. The magnetic head thus formed is the same magnetic head as that shown in FIG. 8. That is, the front edge face of the Gd determining insulating layer 61 at the opposing face (the ABS surface) side is an inclining face.

Figure 26:
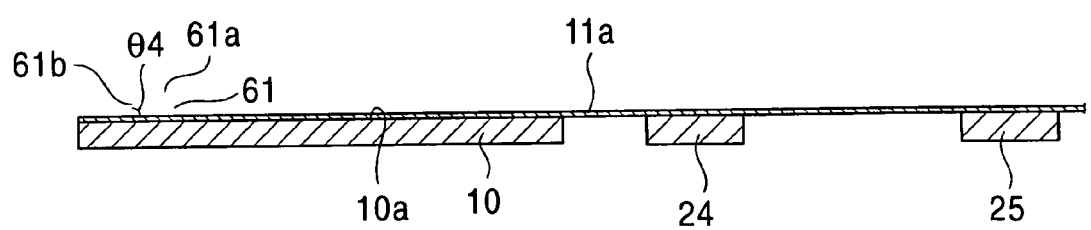
FIG. 26 is a view showing a manufacturing step following the step shown in FIG. 25.

The angle θ1 formed by the upper surface 10a of the lower core layer 10 and the virtual plane S3 including the top edge 12a and the bottom edge 12b of the contacting face between the gap layer 12 and the gap depth determining insulating layer 61 and the angle θ2 formed by the upper surface 10a of the lower core layer 10 and the virtual plane S3 including the top edge 12b and the bottom edge 11b of the contacting face between the lower magnetic layer 11 and the gap depth determining insulating layer 61 are both equal to the angle θ4 formed by the front edge face 61b of the Gd determining insulating layer 61 and the upper surface 10a of the lower core layer 10, shown in FIG. 26. Accordingly, both angles θ1 and θ2 are in the range of about 45 to 90°.

When the Gd determining insulating layer 61 is formed of an inorganic material, the Gd determining insulating layer can be precisely processed, and hence, variations in the gap depth and the thickness of the gap layer can be suppressed.

In the method for manufacturing the thin-film magnetic head of the present invention, a Gd determining insulating layer in a form other than the Gd determining insulating layer 61 may be formed.

In the step shown in FIG. 24, instead of the inorganic insulating layer 72 formed on the lower core layer 10, an organic insulating layer may be formed. The Gd determining insulating layer 61 may be formed by dry-etching the resist layer 71 formed on the organic insulating layer, in a manner similar to the step shown in FIG. 25. As a material for an organic insulating layer, epoxy resins and novolac resins may be used.

Figure 27:
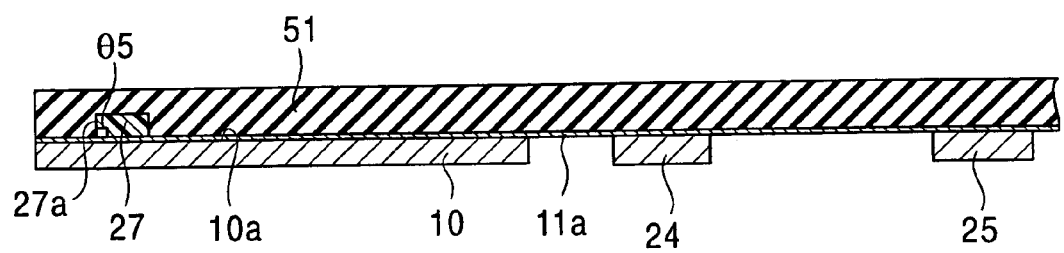
FIG. 27 is a view showing a manufacturing step for a thin-film magnetic head of the present invention.

As shown in FIG. 27, when an angle θ5 formed by a front edge face 27a of a Gd determining insulating layer 27 and an upper surface 10a of a lower core layer 10 is about 80° or more, a magnetic head similar to that shown in FIG. 5 is formed.

In this case, an angle formed by the upper surface 10a of the lower core layer 10 and a virtual face including the top edge and the bottom edge of the contacting face between the gap layer 12 and the Gd determining insulating layer 27 and an angle formed by the upper surface 10a of the lower core layer 10 and a virtual face including the top edge and the bottom edge of the contacting face between the lower magnetic layer 11 and the Gd determining insulating layer 27 are both about 80° or more.

Figure 28:
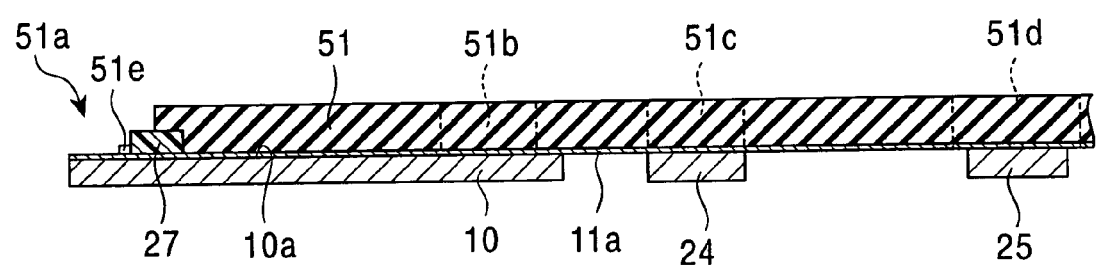
FIG. 28 is a view showing a manufacturing step following the step shown in FIG. 27.
Figure 29:
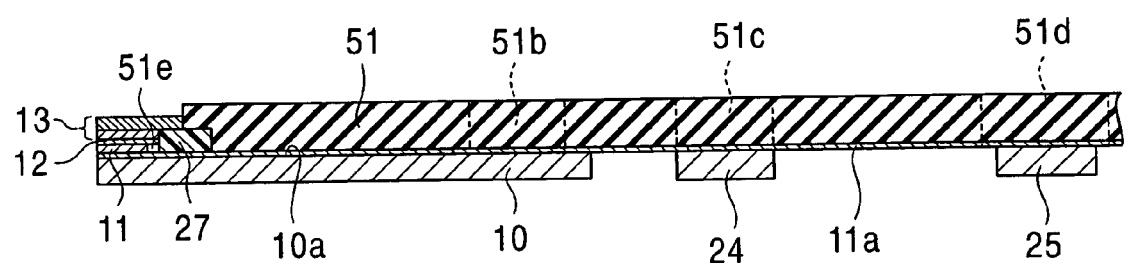
FIG. 29 is a view showing a manufacturing step following the step shown in FIG. 28.

When the angle θ5 formed by the front edge face 27a of the Gd determining insulating layer 27 and the upper surface 10a of the lower core layer 10 is about 80° or more, a residual resist 51e may remain in the groove 51a when the groove 51a is formed by exposure and development in the resist layer 51 covering the Gd determining insulating layer 27 (see FIG. 28).

When the lower magnetic layer 11, the gap layer 12, and the upper magnetic layer 13 are sequentially formed by plating while the residual resist 51e remains in the groove 51a, uniform formation of the lower magnetic layer 11, the gap layer 12, or the upper magnetic layer 13 may be blocked, and as a result, the practical track width of the magnetic head varies, and overwriting characteristics of the magnetic head are degraded.

Accordingly, the angle θ5 formed by the front edge face 27a of the Gd determining insulating layer 27 and the upper surface 10a of the lower core layer 10 is preferably formed to be about 80° or less. However, the angle θ5 may be formed to be about 80° or more.

EXAMPLES

Figure 30:
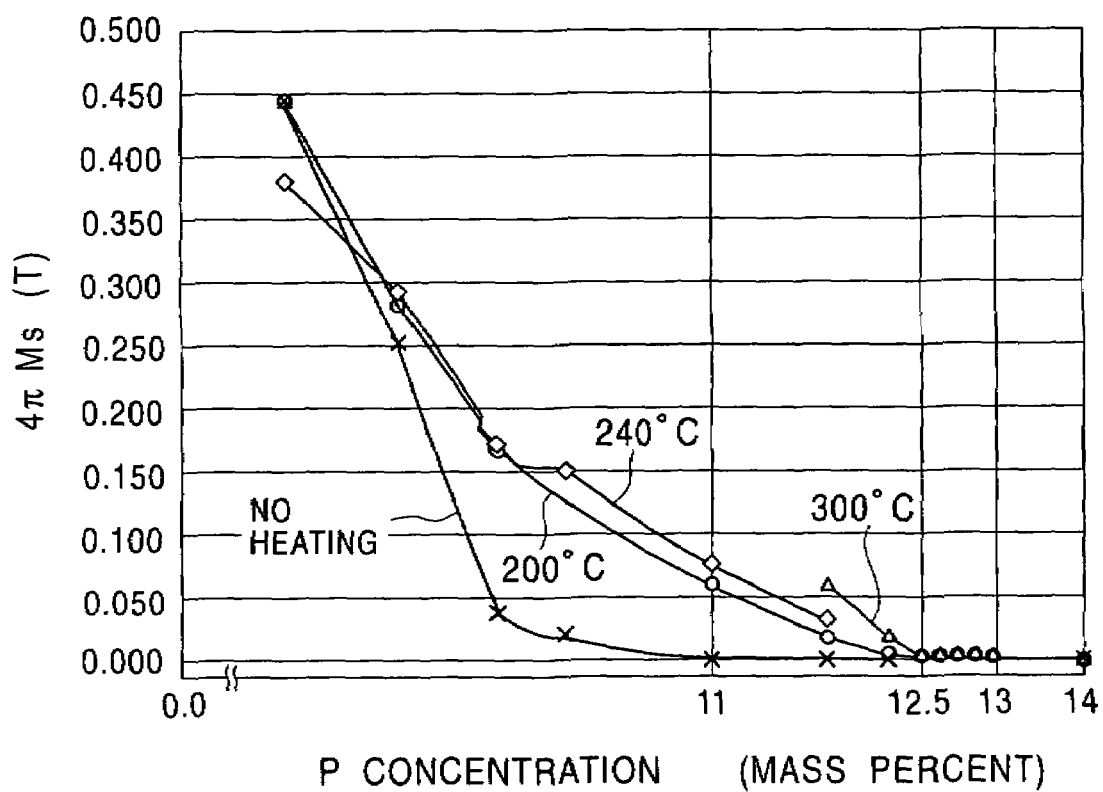
FIG. 30 is a graph showing the relationship between the P content in NiP and the saturated magnetic flux density.

The relationship between the P content in NiP formed by plating and the saturated magnetic flux density were measured. The results are shown in FIG. 30.

When NiP formed by plating was not heated, the NiP was in a nonmagnetic state when the P content was not less than 11 mass percent. In this state, the NiP had an amorphous structure.

In addition, the relationship between the P content in NiP formed by plating and the saturated magnetic flux density were measured when NiP formed by plating was heated to about 200° C., to about 240° C. and to about 300° C.

When amorphous NiP in a non-magnetic state under non-heating condition was heated, the NiP turned into a crystalline material and had magnetic properties depending on the P content.

As can be seen from the FIG. 30, when the P content in the NiP was not less than about 12.5 mass percent, even though the NiP was heated at about 200° C., to about 240° C., and to about 300° C., an amorphous structure of the NiP was maintained and the non-magnetic state thereof was also maintained.

When the thin-film magnetic head of the present invention is actually manufactured, a step for heating the thin-film magnetic head in a process to about 200° C. or more may exist. According to the examples, in the case in which the gap layer of the thin-film magnetic head is formed of NiP, and the P content in the NiP is not less than about 12.5 mass percent, even though the thin-film magnetic head is heated to about 200° C. or more after the gap layer is formed, the non-magnetic state of the NiP forming the gap layer can be maintained.

When no heating step exists in a manufacturing process, the NiP forming the gap layer is in a non-magnetic state when the P content thereof is not less than 11 mass percent.

In this connection, when NiP is formed by plating, the P content therein never exceed about 14 mass percent even though P is contained in excess in the plating solution. Accordingly, in the present invention, when the gap layer is formed of NiP, the upper limiting value of the P content is about 14 mass percent.

In this connection, the P content in the NiP was measured by inductively coupled plasma method.

According to the present invention described in detail hereinbefore, the Gd determining insulating layer for determining the gap depth is formed on the lower core layer at a predetermined distance extending from the opposing face (the ABS surface) opposing a recording medium, and the back end of the upper magnetic layer can be extended onto the Gd determining insulating layer. That is, the area of the interface between the upper core layer and the upper magnetic layer can be increased, and the volume of the upper magnetic layer can also be increased. Accordingly, the restriction of the magnetic flux flowing through the upper core layer at the interface can be suppressed, and since the magnetic flux easily flows in the upper magnetic layer, saturation of the magnetic flux before reaching the gap layer can also be prevented.

That is, in the present invention, leakage flux can be reliably generated from the gap layer, and even when recording frequency is increased, accurate recording can be implemented.

In addition, in the present invention, the back end of the upper magnetic layer is further extended in the height direction compared to that of a conventional magnetic layer, and on the other hand, the area of the gap layer can be maintained to be as small as in a conventional one since the back end of the gap layer in the height direction is restricted by the front edge face of the Gd determining insulating layer. Accordingly, the leakage flux from the gap layer may not be decreased.

In the present invention, the gap layer can be formed of a nonmagnetic metal material by plating, and hence, the lower magnetic layer, the gap layer, and the upper magnetic layer can be sequentially formed by plating.

In addition, in the present invention, a back gap layer composed of a magnetic metal material and/or a nonmagnetic metal material is formed in the posterior region of the Gd determining insulating layer in the height direction so as to be contact with the lower core layer. The upper surface of the back gap layer can be formed so as to be at the same level of the interface (the reference plane) between the upper magnetic layer and the upper core layer and at the same level of the surface of the insulating layer covering the Gd determining insulating layer and the lower core layer, and the base portion of the upper core layer can be formed on the back gap layer so as to be magnetically coupled therewith, whereby the lower core layer and the upper core layer are easily magnetically coupled with each other.

Furthermore, in the present invention, back gap layers composed of a magnetic metal layer and/or a nonmagnetic metal layer can be formed on the lead electrode layers formed under the insulating layer, the upper surfaces of the back gap layers can be formed so as to be at the same level of the reference plane and the upper surface of the insulating layer, and the back gap layers and the terminals of the coil layer can be electrically connected with each other, whereby the coil layer and the lead electrode layers can be easily connected with each other.

In addition, in the present invention, when the angle formed by the upper surface of the lower core layer and the virtual plane including the top edge and the bottom edge of the contacting face between the gap layer and the gap depth determining insulating layer is set to be in the range of about 45 to 90°, degradation in writing characteristics of the thin-film magnetic head can be prevented.

Furthermore, in the present invention, when the angle formed by the upper surface of the lower core layer and the virtual plane including the top edge and the bottom edge of the contacting face between the lower magnetic layer and the gap depth determining insulating layer is set to be in the range of about 45 to 90°, degradation in writing characteristics of the thin-film magnetic head can also be prevented.

What is claimed is:

1. A thin-film magnetic head comprising:
   a lower core layer having an upper surface;
   a gap layer formed on the lower core layer;
   an upper magnetic layer for determining a track width formed on the gap layer, the width of the upper magnetic layer being smaller than that of the lower core layer;
   an upper core layer formed on the upper magnetic layer; and
   a gap depth determining insulating layer for determining a gap depth which is a depth of an interface between the gap layer and the upper magnetic layer in a height direction extending from an opposing face opposing a recording medium, the gap depth determining insulating layer disposed adjacent to the upper surface in a posterior region extending from the opposing face in the height direction;
   wherein a contacting face between the upper magnetic layer and the gap depth determining insulating layer is provided at a contacting location deeper in the height direction than a forming location at which the gap depth is formed.

2. A thin-film magnetic head according to claim 1, wherein the contacting face between the upper magnetic layer and the gap depth determining insulating layer is provided so as to be gradually deeper in the height direction from the bottom to the top of the contacting face.

3. A thin-film magnetic head according to claim 2, wherein the gap depth determining insulating layer is provided with a sloping face formed so as to be gradually deeper in height direction from the bottom to the top of the sloping face, and wherein the upper magnetic layer is continuously provided on the gap layer and the sloping face of the gap depth determining insulating layer.

4. A thin-film magnetic head according to claim 2, wherein the gap depth determining insulating layer is provided with a vertical face at the opposing face side, the vertical face being approximately vertical along the lower core layer, and wherein the back end of the gap layer in the height direction and the back end of the interface between the gap layer and the upper magnetic layer in the height direction are in contact with the vertical face.

5. A thin-film magnetic head according to claim 1, wherein an angle formed by the upper surface of the lower core layer and a virtual plane including the top edge of the bottom edge of the contacting face between the gap layer and the gap depth determining insulating layer is in the range of about 45° to 90°.

6. A thin-film magnetic head according to claim 5, wherein the angle formed by the upper surface of the lower core layer and the virtual plane including the top edge and the bottom edge of the contacting face between the gap layer and the gap depth determining insulating layer is about 80° or less.

7. A thin-film magnetic head according to claim 1, wherein an angle formed by the upper surface of the lower core layer and a virtual plane including the top edge and the bottom edge of a contacting face between the lower magnetic layer and the gap depth determining insulating layer is in the range of about 45° to 90°.

8. A thin-film magnetic head according to claim 7, wherein the angle formed by the upper surface of the lower core layer and the virtual plane including the top edge and the bottom edge of the contacting face between the lower magnetic layer and the gap depth determining insulating layer is about 80° or less.

9. A thin-film magnetic head according to claim 1, wherein the gap depth determining insulating layer comprises an organic material.

10. A thin-film magnetic head according to claim 9, wherein the gap depth determining insulating layer comprises an ultraviolet photocurable resin material.

11. A thin-film magnetic head according to claim 1, wherein the gap depth determining insulating layer comprises an inorganic material.

12. A thin-film magnetic head according to claim 11, wherein the gap depth determining insulating layer comprises one of $SiO_2$ and $Al_2O_3$.

13. A thin-film magnetic head according to claim 1, wherein the gap layer comprises a nonmagnetic metal material which can be applied by plating.

14. A thin-film magnetic head according to claim 13, wherein the nonmagnetic metal material is at least one selected from the group consisting of NiP, NiPd, NiW, NiMo, NiRh, Au, Pt, Rh, Pd, Ru, and Cr.

15. A thin-film magnetic head according to claim 14, wherein the nonmagnetic metal material is NiP, and the P content in the NiP measured by inductively coupled plasma emission spectrometry is in the range of about 11 to 14 mass percent.

16. A thin-film magnetic head according to claim 15, wherein the nonmagnetic metal material is NiP, and the P content in the NiP measured by inductively coupled plasma emission spectrometry is in the range of about 12.5 to 14 mass percent.

17. A thin-film magnetic head according to claim 1, further comprising an insulating layer formed in a posterior region of the gap depth determining insulating layer in the height direction so as to be in contact therewith, and a coil layer provided on the insulating layer inducing a recording magnetic field in the upper core layer and the lower core layer, wherein, when an interface between the upper magnetic layer and the upper core layer is a reference plane, the upper surface of the insulating layer is at the same level as the reference plane.

18. A thin-film magnetic head according to claim 17, wherein the insulating layer is provided so as to cover the gap depth determining insulating layer and to be in contact with the back end of the upper magnetic layer in the height direction.

19. A thin-film magnetic head according to claim 17, wherein the insulating layer is an inorganic insulating layer comprising an inorganic material.

20. A thin-film magnetic head according to claim 17, further comprising a lead electrode layer formed under the insulating layer, and a back gap layer formed on the lead electrode layer, the back gap layer comprising at least one of a magnetic metal material and a nonmagnetic metal material;

wherein the upper surface of the back gap layer is at the same level as the reference plane and the upper surface of the insulating layer, and a terminal of the coil layer is electrically connected with the back gap layer.

21. A thin-film magnetic head according to claim 17, further comprising a back gap layer formed in the insulating layer in a posterior region of the gap depth determining insulating layer in the height direction so as to be in contact with the lower core layer, the back gap layer comprising at least one of a magnetic metal material and a nonmagnetic metal material;

wherein the upper surface of the back gap layer is at the same level as the reference plane and the upper surface of the insulating layer, and a base portion of the upper core layer is magnetically coupled with the back gap layer.

22. A thin-film magnetic head according to claim 21, wherein the back gap layer is a multiple-layer film having the same laminated structure as that formed of the lower magnetic layer, the gap layer, and the upper magnetic layer.

23. A thin-film magnetic head according to claim 21, wherein the back gap layer is a single layer film composed of the same material as one of a material for the lower core layer and a material for the upper core layer.

24. A thin-film magnetic head according to claim 21, wherein the back gap layer is one of a single layer film and a multiple-layer film, the back gap layer composed of a magnetic metal material differing from one of a material for the lower core layer and a material for the upper core layer.

25. A thin-film magnetic head according to claim 1, further comprising a lower magnetic layer disposed between the gap layer and the lower core layer.

* * * * *